United States Patent
Sato

(10) Patent No.: US 7,751,070 B2
(45) Date of Patent: Jul. 6, 2010

(54) IMAGE INPUT APPARATUS, IMAGE OUTPUT APPARATUS, IMAGE FORMING SYSTEM, CONTROL METHOD OF IMAGE INPUT APPARATUS, CONTROL METHOD OF IMAGE OUTPUT APPARATUS, PROGRAMS FOR EXECUTING THESE METHODS, STORAGE MEDIUM FOR STORING PROGRAMS, IMAGE PROCESSING SYSTEM, CONTROL METHOD OF IMAGE PROCESSING SYSTEM, AND PROGRAM FOR EXECUTING CONTROL METHOD

(75) Inventor: Hirochika Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1399 days.

(21) Appl. No.: 10/784,990

(22) Filed: Feb. 25, 2004

(65) Prior Publication Data

US 2004/0169881 A1  Sep. 2, 2004

(30) Foreign Application Priority Data

Feb. 28, 2003 (JP) .............................. 2003-052220

(51) Int. Cl.
G06F 3/12 (2006.01)
G06K 15/10 (2006.01)
H04N 1/04 (2006.01)

(52) U.S. Cl. .................... 358/1.13; 358/1.5; 358/474

(58) Field of Classification Search ................ 358/1.13, 358/1.5, 474
See application file for complete search history.

(56) References Cited

U.S. PATENT DOCUMENTS 7,345,784 B2  3/2008  Osawa

2002/0044298 A1  4/2002  Kaneko et al.
2002/0085223 A1*  7/2002  Bigi .......................... 358/1.13

FOREIGN PATENT DOCUMENTS

| JP | 9-219788 | 8/1997 |
|---|---|---|
| JP | 9-247427 | 9/1997 |
| JP | 10117281 | 5/1998 |
| JP | 11-112781 | 4/1999 |
| JP | 2002-44312 | 2/2002 |
| JP | 2002-077492 | 3/2002 |
| JP | 2002-112009 | * 4/2002 |
| JP | 2002-176522 | 6/2002 |
| JP | 2003324599 | 11/2003 |

* cited by examiner

Primary Examiner—Houshang Safaipour
(74) Attorney, Agent, or Firm—Fitzpatrick, Cella, Harper & Scinto

(57) ABSTRACT

Remote output environment remarkably improving convenience in remote output mode is provided so that print process according to original direction information detected by transmitter image forming apparatus can be performed by receiver image forming apparatus. Therefor, image processing system including first device having input unit of inputting image data and communication unit of performing data communication, and second device having communication unit of performing data communication and output unit of outputting image data sets the remote output mode for performing through the communication unit the data communication of the image data input by the first device and causing the second device to output the communicated data, causes the first device to acquire the direction information input by the first device, and causes in this mode the second device to output the image data from the first device in output manner based on the acquired information.

11 Claims, 23 Drawing Sheets

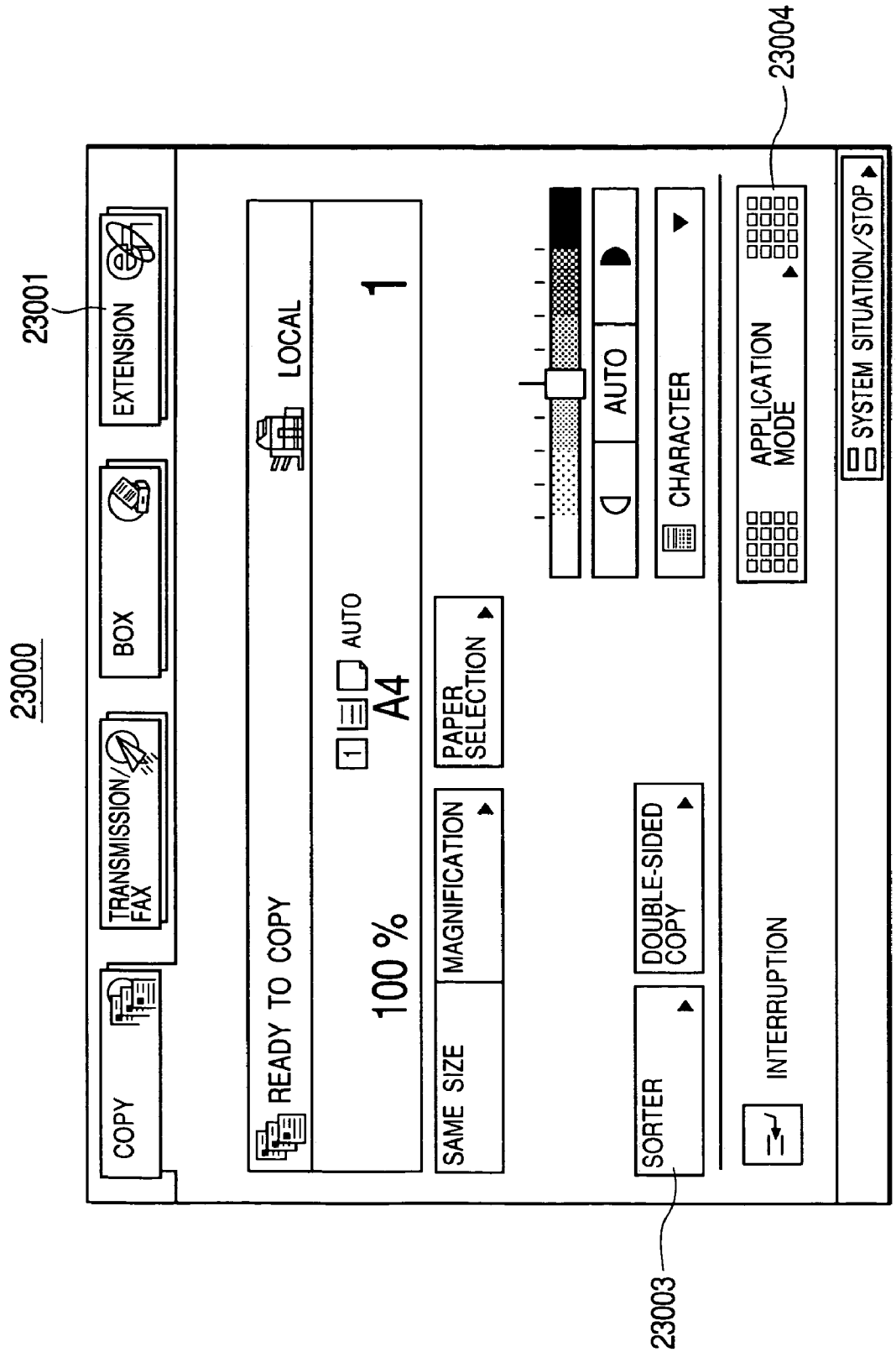

SORTER : SELECTION OF KIND

| SORT (PER EACH COPY) | GROUP (PER EACH PAGE) | STAPLING SORT 26001 |

☐ SHIFT    PUNCH HOLE

| CANCEL SETTING | ◀ RETURN | NEXT ▶ |

SORTER : SETTING OF STAPLING POSITION

CORNER

- CORNER
- DOUBLE
- SADDLE STITCHING

SELECT STAPLING POSITION

| UPPER LEFT 27001 | UPPER RIGHT 27002 |
| LOWER LEFT 27003 | LOWER RIGHT 27004 |

| CANCEL SETTING | ◀ RETURN | OK ↵ |

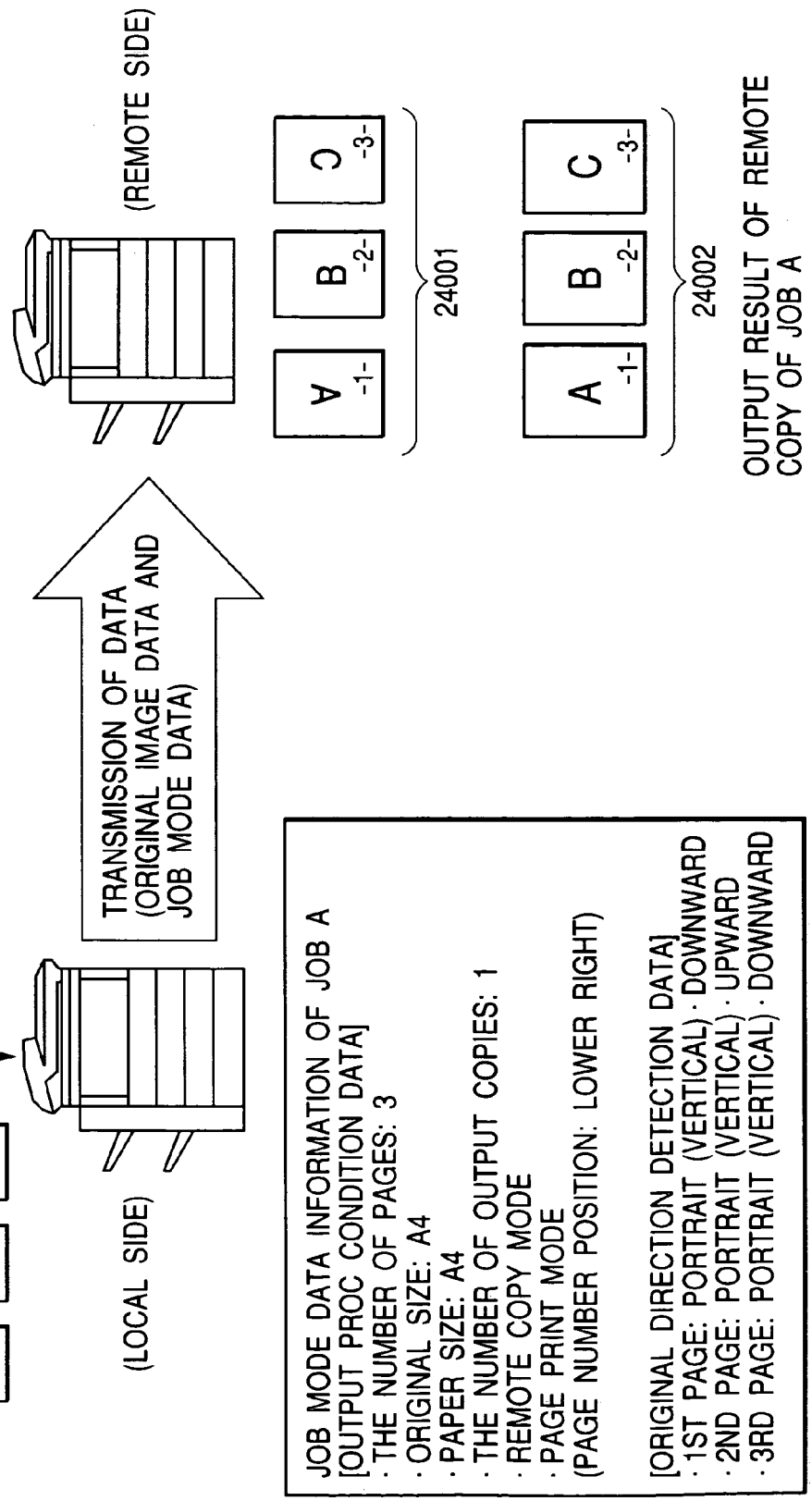

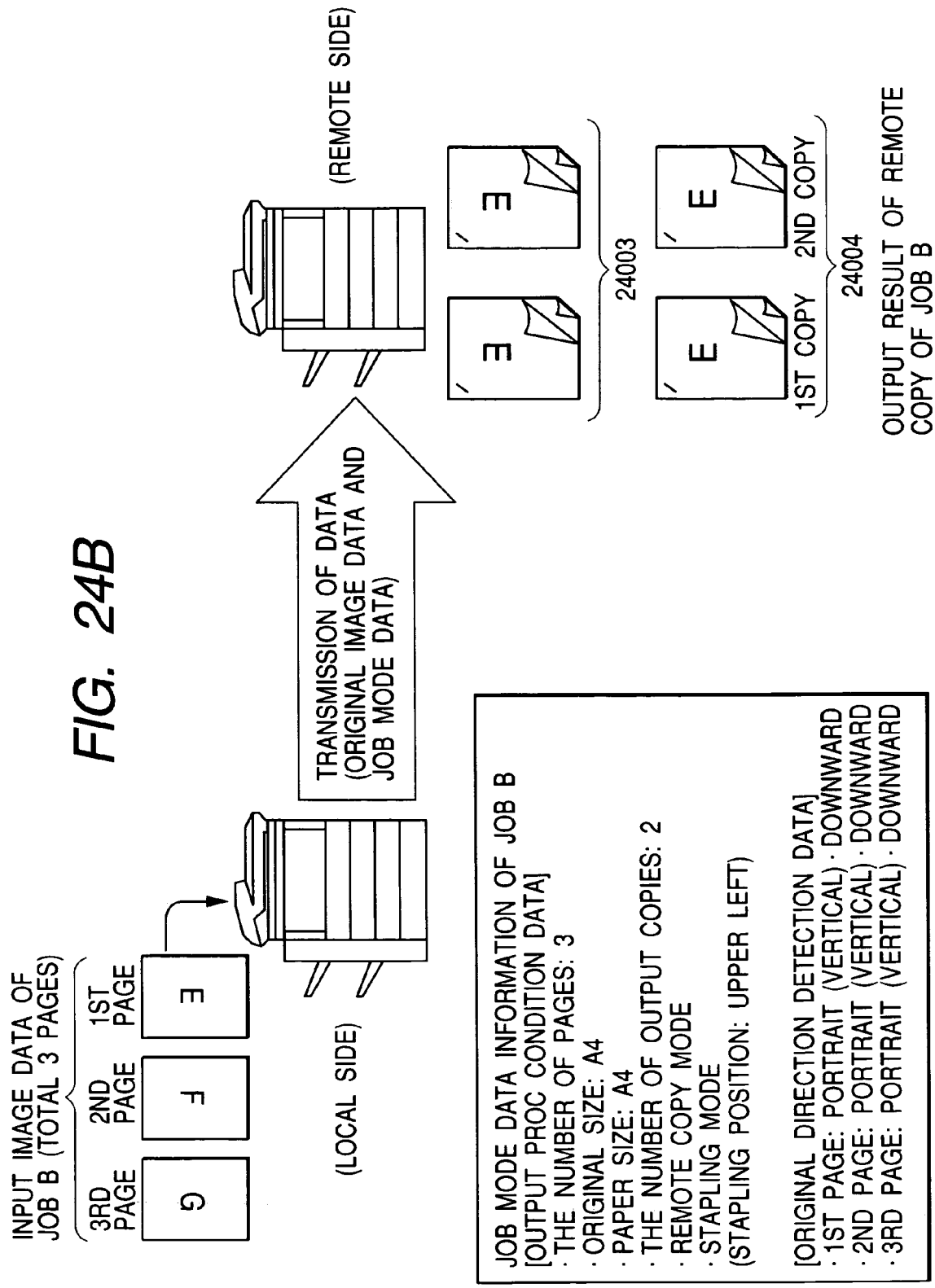

FIG. 25

STORAGE MEDIUM SUCH AS FD, CD-ROM OR THE LIKE

| DIRECTORY INFORMATION |
|---|
| 1ST PROC PROGRAM<br>PROGRAM CODE GROUP CORRESPONDING TO STEPS OF FLOW CHART SHOWN IN FIG. 17 |
| 2ND PROC PROGRAM<br>PROGRAM CODE GROUP CORRESPONDING TO STEPS IN FLOW CHART SHOWN IN FIG. 19 |
| 3RD PROC PROGRAM<br>PROGRAM CODE GROUP CORRESPONDING TO STEPS IN FLOW CHART SHOWN IN FIG. 22 |
| 4TH PROC PROGRAM<br>PROGRAM CODE GROUP FOR CAUSING TO DISPLAY OPERATION SCREENS SHOWN IN FIGS. 21 AND 23A-23E |
| 5TH PROC PROGRAM<br>PROGRAM CODE GROUP FOR CAUSING TO EXECUTE A SERIES OF OUTPUT OPERATION CONTROL SHOWN IN FIGS. 24A AND 24B |

MEMORY MAP OF STORAGE MEDIUM

IMAGE INPUT APPARATUS, IMAGE OUTPUT APPARATUS, IMAGE FORMING SYSTEM, CONTROL METHOD OF IMAGE INPUT APPARATUS, CONTROL METHOD OF IMAGE OUTPUT APPARATUS, PROGRAMS FOR EXECUTING THESE METHODS, STORAGE MEDIUM FOR STORING PROGRAMS, IMAGE PROCESSING SYSTEM, CONTROL METHOD OF IMAGE PROCESSING SYSTEM, AND PROGRAM FOR EXECUTING CONTROL METHOD

BACKGROUND OF THE INVENTION

1. Field of the Invention

The present invention relates to control for a remote copy operation in, e.g., an image forming system which includes an image input apparatus and an image output apparatus communicably connected to each other through a predetermined communication medium.

2. Related Background Art

In recent years, along with the popularization of networks in plenty of offices and the like, image forming apparatuses such as a digital copying apparatus, a printer and the like each of which has a network connection function are widely used. In this connection, an image forming system in which it is possible to perform printing and scanning by using the image forming apparatus through the network is in widespread use (see Japanese Patent Application Laid-Open No. 2002-176522).

The image forming system of this type can also perform a remote copy operation, a multicopy operation and the like. Here, in the remote copy operation, an original is first scanned by a certain apparatus, the scanned image is transmitted from the certain apparatus to the designated printer on the network, and the transmitted image data is then printed by the designated printer. Besides, in the multicopy operation, an original is first scanned by a certain apparatus, the scanned image is transmitted to the plural printers on the network, and the transmitted image data is then printed by the plural printers respectively. In addition, in the image forming system of this type, it is possible to transmit the image data accumulated and stored on the side of a local apparatus to the remote printer, and actually print the transmitted data by the remote printer.

Incidentally, when a remote copy instruction is issued by a certain apparatus provided on the network, the remote printer which is designated to receive the remote copy instruction can also receive remote copy instructions issued and transmitted from other plural apparatuses. Therefore, the plural remote copy instructions are once spooled in the memory of the remote printer, and plural jobs respectively corresponding to the spooled remote copy instruction can be then printed.

Moreover, as shown in Japanese Patent Application Laid-Open No. 9-247427, the copying apparatus that the direction of an original put thereon is determined, and image processes such as a reduction layout process and the like and determination of a stapling position are performed based on the determined direction is proposed.

As just described, in the one copying machine, it is possible to detect the direction of the original and perform the image processes (e.g., the process concerning a page print function, the process concerning a reduction layout function, the process concerning a binding function, etc.) based on the detected result. However, in the remote copy operation and the multicopy operation to be performed in the conventional image forming system, it is impossible to notify the remote apparatus side (i.e., the image forming apparatus on the reception side) of the original direction information detected on the local apparatus side (i.e., the image forming apparatus on the transmission side), perform the image editing process according to the notified information, and then actually print the processed image data. For this reason, it is desired to further improve convenience of operations in a so-called remote output mode for performing the remote copy (print) operation, the multicopy operation and the like.

SUMMARY OF THE INVENTION

An object of the present invention is to provide an image input apparatus, an image output apparatus and an image forming system for solving such a conventional problem as above, and further provide a control method of the image input apparatus, a control method of the image output apparatus, programs for executing the control methods, a storage medium for storing the programs, an image processing system for solving the above conventional problem, a control method of the image processing system, and a program for executing the control method.

Another object of the present invention is to provide an image input apparatus, an image output apparatus and an image forming system together capable of constructing a remote output environment which remarkably improves convenience of operations in a remote output mode that, for example, a print process according to original direction information detected by an image forming apparatus on a transmission side can be performed by an image forming apparatus on a reception side, and further provide a control method of the image input apparatus, a control method of the image output apparatus, programs for executing the control methods, a storage medium for storing the programs, an image processing system for achieving the above, a control method of the image processing system, and a program for executing the control method.

Other object and features of the present invention will become apparent from the following description in conjunction with the accompanying drawings.

BRIEF DESCRIPTION OF THE DRAWINGS

FIGS. 23A, 23B, 23C, 23D and 23E are diagrams respectively showing an example of a user interface screen according to the embodiment;

FIGS. 24A and 24B are diagrams respectively showing a control example according to the embodiment; and FIG. 25 is a diagram for explaining a memory map of a storage medium which stores various data processing program capable of being read by the image forming system to which the image input apparatus and the image output apparatus according to the present invention are applicable.

DETAILED DESCRIPTION OF THE PREFERRED EMBODIMENT

Hereinafter, the embodiment of the present invention will be explained with reference to the attached drawings.

Figure 1:
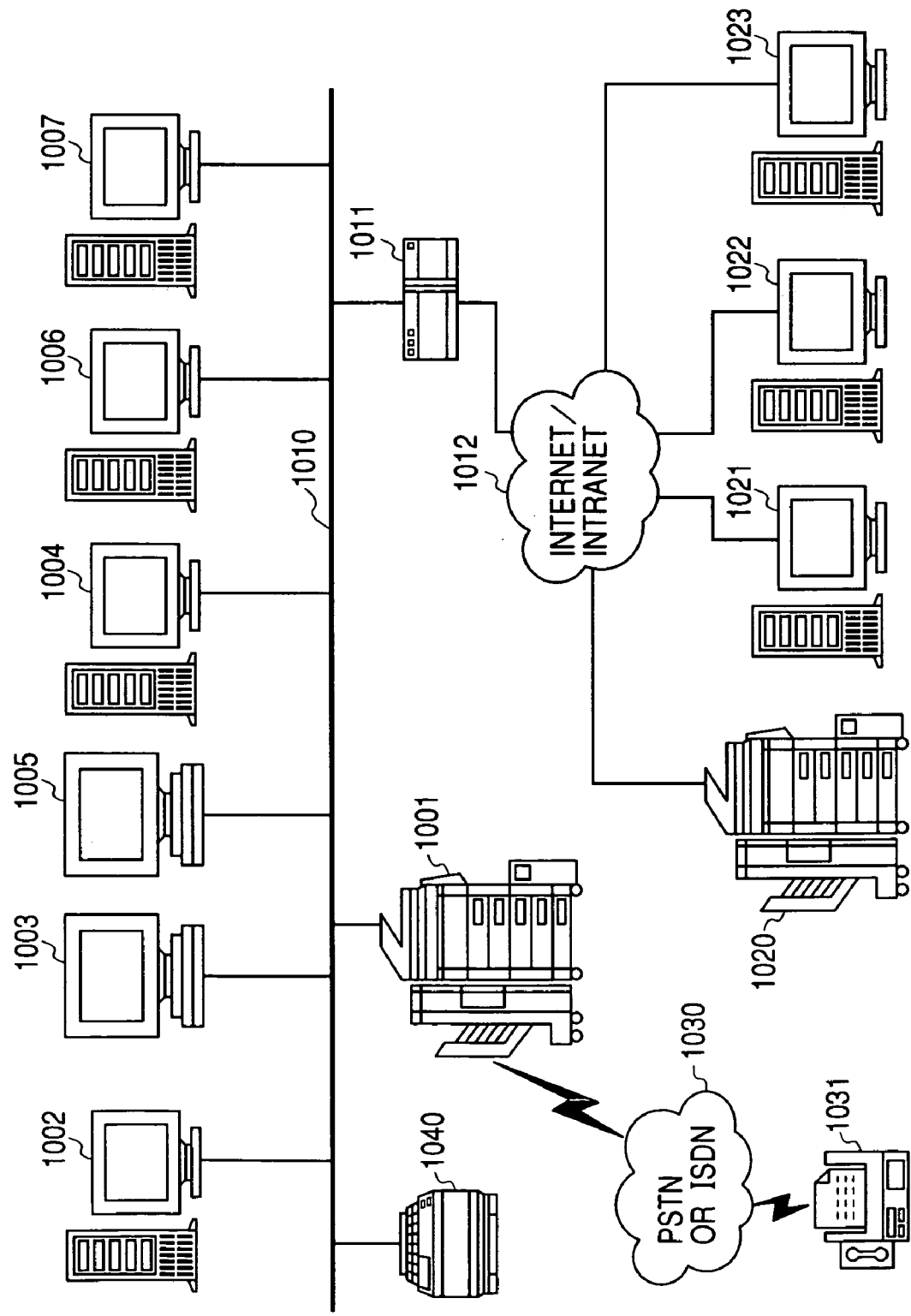
FIG. 1 is a diagram showing an example of a network structure of an image forming system to which an image input apparatus and an image output apparatus according to the present invention are applicable.

FIG. 1 is a diagram showing an example of a network structure of an image forming system to which an image input apparatus and an image output apparatus according to the present invention are applicable.

In FIG. 1, numeral 1001 denotes a digital multifunctional apparatus (also called a first image forming apparatus, a first image processing apparatus, or simply a first device) which can at least function as an example of the image input apparatus, and is equipped with a scanner, a memory unit such as a hard disk or the like, a printer, and the like (all described later). The digital multifunctional apparatus 1001 can transmit job data (simply called image data or an image) read from the scanner to a LAN (local area network) 1010 through of the memory of the own apparatus (this operation is called a network scanner function), and can print out the image received from the LAN 1010 on a recording medium by using the printer through the memory of the own apparatus (this operation is called a network printer function). Moreover, the digital multifunctional apparatus 1001 can transmit the image read from the scanner to a PSTN (public switched telephone network) or ISDN (Integrated Services Digital Network) 1030 by using a facsimile transmission means such as a later-described modem or the like (this operation is called a facsimile transmission function), and can print out the image received from the PSTN or ISDN 1030 on a recording medium by using the printer (this operation is called a facsimile reception print function). Furthermore, the digital multifunctional apparatus 1001 can cause the printer of the own apparatus to print out the data obtained by the scanner of the own apparatus through the memory of the own apparatus (this operation is called a local copy function). In addition, the digital multifunctional apparatus 1001 can transmit the data obtained by the scanner of the own apparatus to a digital multifunctional apparatus 1020 (or 2902 or 2903 shown in FIG. 14) which can at least function as an example of the image output apparatus through the memory of the own apparatus, and can cause the printer unit of the digital multifunctional apparatus 1020 (or 2902 or 2903 shown in FIG. 14) to print the data in question (this operation is called a remote copy function). As just described, the digital multifunctional apparatus 1001 is structured as the multifunctional apparatus which can communicate with another remote apparatus through a communication unit and also includes the plural kinds of functions.

Incidentally, the digital multifunctional apparatus 1020 (or 2902 or 2903 shown in FIG. 14) (also called a second image forming apparatus, a second image processing apparatus, or simply a second device) which is included in the image forming system shown in FIG. 1 being the example of the embodiment and can communicate with the digital multifunctional apparatus 1001 includes various kinds of units (e.g., a scanner unit, a memory unit such as a hard disk or the like, a printer unit, etc.) and various kinds of functions (e.g., a network scanner function, a network printer function, a facsimile transmission function, a facsimile reception print function, a local copy function, a remote copy function, etc.) likewise the digital multifunctional apparatus 1001. Therefore, in the image forming system in question, the digital multifunctional apparatus 1020 (or 2902 or 2903 shown in FIG. 14) can achieve the process and the operation which are the same as those of the digital multifunctional apparatus 1001. However, the embodiment is not limited to the above, that is, the embodiment is also applicable to a system in which the digital multifunctional apparatus 1020 (or 2902 or 2903 shown in FIG. 14) includes at least a part of the units and the functions of the digital multifunctional apparatus 1001.

Moreover, as just described, each of the digital multifunctional apparatus 1001 and the digital multifunctional apparatus 1020 (or 2902 or 2903 shown in FIG. 14) may be the so-called all-in-one apparatus which includes the plural units such as the scanner, the memory unit such as the hard disk or the like, the printer unit, the controller and the like. Alternatively, each of the digital multifunctional apparatus 1001 and the digital multifunctional apparatus 1020 (or 2902 or 2903 shown in FIG. 14) may be structured as a system which includes all of the above units each having the independent body.

As above, the embodiment is applicable to the various apparatuses and systems. In any case, the present invention is applicable to the structure which can achieve later-described operation control of the embodiment.

Numeral 1002 denotes a database server which administrates a binary image and a multivalued image read by the digital multifunctional apparatus 1001, as databases. Numeral 1003 denotes a database client of the database server 1002, by which read, search and the like of the image data stored in the database server 1002 can be performed.

Numeral 1004 denotes an electronic mail server which can receive the image read by the digital multifunctional apparatus 1001, as an attachment of an electronic mail. Numeral 1005 denotes an electronic mail client which can read the electronic mail received by the electronic mail server 1004 and transmit an electronic mail.

Numeral 1006 denotes a WWW (World Wide Web) server which provides an HTML (Hypertext Markup Language) document to the LAN 1010. The HTML document provided by the WWW server 1006 can be printed out by the digital multifunctional apparatus 1001. Besides, numeral 1007 denotes a DNS (domain name server).

Numeral 1011 denotes a router which connects the LAN 1010 to an Internet/intranet 1012. Further, a database server 1021, a WWW server 1022, an electronic mail server 1023 and the digital multifunctional apparatus 1020 which are respectively the same as the above database server 1002, the WWW server 1006, the electronic mail server 1004 and the digital multifunctional apparatus 1001 are connected to the Internet/intranet 1012.

On one hand, the digital multifunctional apparatus 1001 can transmit/receive data to/from a facsimile apparatus 1031 through the PSTN or ISDN 1030. Further, a printer 1040 is connected on the LAN 1010 to be able to print out the image read by the digital multifunctional apparatus 1001.

Figure 2:
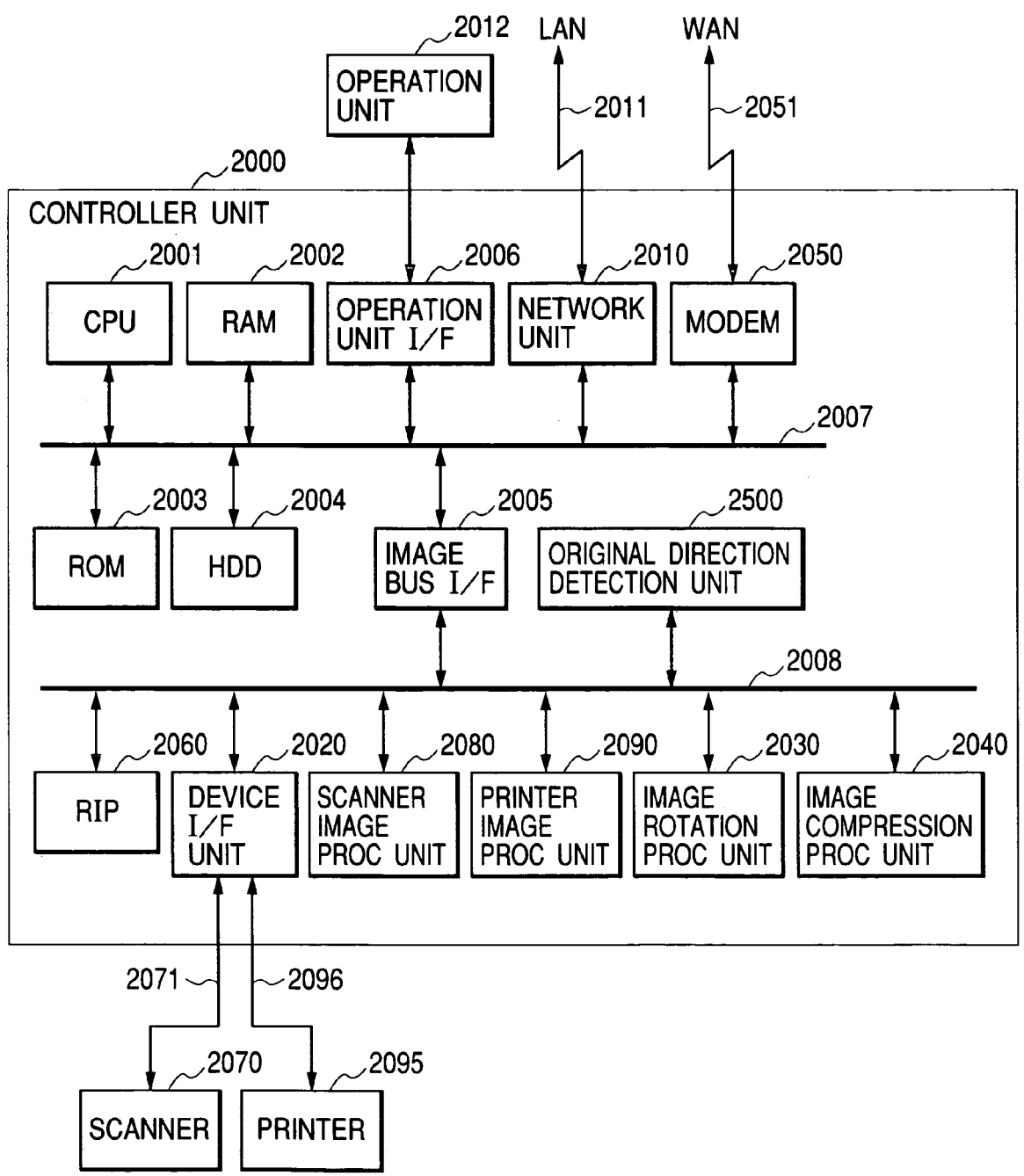
FIG. 2 is a block diagram showing the hardware entire structure of a digital multifunctional apparatus shown in FIG. 1.

FIG. 2 is a block diagram showing the hardware entire structure of the digital multifunctional apparatus 1001 shown in FIG. 1.

In FIG. 2, numeral 2000 is a controller unit which is connected to a scanner 2070 being the image input device and a printer 2095 being the image output device respectively through lines 2071 and 2096 and, meanwhile to a LAN 2011 (corresponding to the LAN 1010 shown in FIG. 1) and a WAN (wide area network) 2051 (also called a public line 2051 hereinafter; and corresponding to the PSTN shown in FIG. 1), thereby inputting and outputting image information and device information.

In the controller unit 2000, numeral 2001 denotes a CPU which controls the entire system on the basis of programs stored in a ROM 2003, an HDD (hard disk drive) 2004 or another storage medium. Moreover, numeral 2002 denotes a RAM which acts as a system working memory used by the CPU 2001. The RAM 2002 also acts as the image memory for temporarily storing image data. The ROM 2003 is the boot ROM which stores a system boot program. Incidentally, the HDD 2004 stores system software, image data and the like.

Numeral 2006 denotes an operation unit I/F (interface) which interfaces with an operation unit 2012, outputs the image data to be displayed to the operation unit 2012, and also transmits information input by a user from the operation unit 2012 of this system to the CPU 2001. Numeral 2010 denotes a network unit which is connected to the LAN 2011 to input and output information, and numeral 2050 denotes a modem which is connected to the WAN or public line 2051 to input and output information. The above devices are arranged on a system bus 2007.

Numeral 2005 denotes an image bus I/F which is the bus bridge for connecting the system bus 2007 to an image bus 2008 transferring image data at high speed and converting a data structure. The image bus 2008 is structured by a high-speed bus such as a PCI (peripheral component interface) bus or an IEEE1394 (Institute of Electrical and Electronic Engineers Standard 1394) bus. Incidentally, the following devices are arranged on the image bus 2008.

Numeral 2060 denotes an RIP (raster image processor) which decompresses or expands a PDL (page description language) code into an bit map image. Numeral 2020 denotes a device I/F unit which connects the scanner 2070 being the image input device and the printer 2095 being the image output device to the controller unit 2000 and performs synchronous system/asynchronous system conversion of image data.

Numeral 2080 denotes a scanner image processing unit which performs correction, process and editing to input image data. Numeral 2090 denotes a printer image processing unit which performs printer correction, resolution conversion and the like to print output image data.

Numeral 2500 denotes an original direction detection unit which detects the direction (or orientation) of an original based on the input image data. That is, the original direction detection unit 2500 first discriminates which direction (upper, lower, right or left) the original is placed and whether the original is a portrait (i.e., vertical writing) original or a landscape (i.e., horizontal writing) original, and then outputs the discriminated results. Incidentally, the original direction detection unit 2500 generates two kinds of information as original direction detection data, that is, one is original direction information being first information to specify which direction (upper, lower, right or left) the original is placed, and the other is original kind information being second information to specify whether the original is the portrait (i.e., vertical writing) original or the landscape (i.e., horizontal writing) original. The original direction detection data including the first information and the second information is controlled by the CPU 2001 to be able to be used in both a case where the original data is printed by the printer unit of the own apparatus (i.e., the digital multifunctional apparatus 1001), and a case where in the remote copy mode the original data is transmitted from the own apparatus to another digital multifunctional apparatus (i.e., the digital multifunctional apparatus 1020, 2902 or 2903) and the transmitted data is then printed by the printer unit of another digital multifunctional apparatus in question. For example, when the local copy mode is selected by the user on the operation unit of the own apparatus (i.e., the digital multifunctional apparatus 1001), the CPU 2001 performs the control so that the output image based on the original direction detection data acquired or obtained from the original direction detection unit 2500 of the own apparatus is generated through the memory unit or the like of the own apparatus from the original image data input through the scanner of the own apparatus, and the generated output image is printed on a recording medium by the printer unit of the own apparatus. On one hand, when the remote copy mode is selected by the user on the operation unit of the own apparatus (i.e., the digital multifunctional apparatus 1001), the CPU 2001 performs the control so that the original image data input through the scanner of the own apparatus is transmitted to another digital multifunctional apparatus (i.e., the digital multifunctional apparatus 1020, 2902 or 2903) being the remote copy destination through the communication unit.

At the same time, it is controlled by the CPU 2001 to transmit the original direction detection data acquired from the original direction detection unit 2500 of the own apparatus, print output condition setting parameters set by the user, and the like to another digital multifunctional apparatus (i.e., the digital multifunctional apparatus 1020, 2902 or 2903) being the remote copy destination through the communication unit. In this case, it should be noted that these data to be transmitted together with the image data to be printed are associated with the image data in question before these data are actually transmitted. Then, on the side of another digital multifunctional apparatus, it is controlled to perform the image process of the original image data based on the original direction detection data, the print output condition setting parameters and the like, generate the processed image data as the output image data, and print out the output image data generated based on the original direction detection data, the output conditions and the like on a recording paper by using the printer unit of another digital multifunctional apparatus in question. Here, as the method of detecting the original direction (or orientation) in the original direction detection unit 2500, for example, a conventionally known method of discriminating the direction by appropriately combining character recognition and image information rotation is used. In this method, the original direction detection data including a two-bit code representing which direction (upper, lower, right or left) the original is placed and a one-bit code representing whether the original is the portrait original or the landscape original is generated. For example, the image signal of the original is first input to the original direction detection unit 2500, a character area portion is specified and separated from the input image signal, and only the character portion extracted from the original image. Then, the character area is cut out based on accumulated histograms of image data in the vertical direction and the horizontal direction of the original. In this case, by checking which of the vertical direction and the horizontal direction more images are arranged in, it is possible to discriminate and specify whether the original is the portrait (i.e., vertical writing) original or the landscape (i.e., horizontal writing) original. For example, when the ratio of the images arranged in the horizontal direction is larger than the ratio of the images arranged in the vertical direction, it is discriminated that the original is the landscape (i.e., horizontal writing) original. On the contrary, when the ratio of the images arranged in the vertical direction is larger than the ratio of the images arranged in the horizontal direction, it is discriminated that the original is the portrait (i.e., vertical writing) original. Besides, in case of discriminating the original direction, the original direction detection unit 2500 further cuts out the characters in units of one character from the cut-out character region, and then performs a character direction matching process to discriminate which of the upper, lower, right and left directions the cut-out character is directed to. More specifically, the cut-out character and sample character data previously prepared in a not-shown memory of the apparatus are compared with each other in units of 90° to obtain a matching rate between the cut-out character and the sample character data, whereby the character direction is recognized. To be more concrete, for example, the matching rate between the cut-out character and the sample character of the character direction 0° is confirmed, the matching rate between the cut-out character and the sample character of the character direction 90° is confirmed, the matching rate between the cut-out character and the sample character of the character direction 180° is confirmed, and the matching rate between the cut-out character and the sample character of the character direction 270° is confirmed.

Then, from among such angles as above, the angle where the highest matching rate is obtained is determined as the character direction of the character data in question, and the information representing this angle is adopted as the information representing the original direction. Incidentally, the original direction detection unit 2500 can also detect an original direction based on image data registered in a later-described memory box B in the HDD 2004.

Numeral 2030 denotes an image rotation processing unit which performs a rotation process to the input image data based on process conditions set by the user through the operation unit and the original direction detection data acquired from the original direction detection unit 2500. Numeral 2040 denotes an image compression processing unit which performs an image compression/decompression process to multivalued image data in a JPEG (Joint Photographic Experts Group) system and performs an image compression/decompression process to binary image data in a JBIG (Joint Bi-level Image Experts Group) system, an MMR (modified modified READ (relative element address)) system or an MH (modified Huffman) system.

Figure 3:
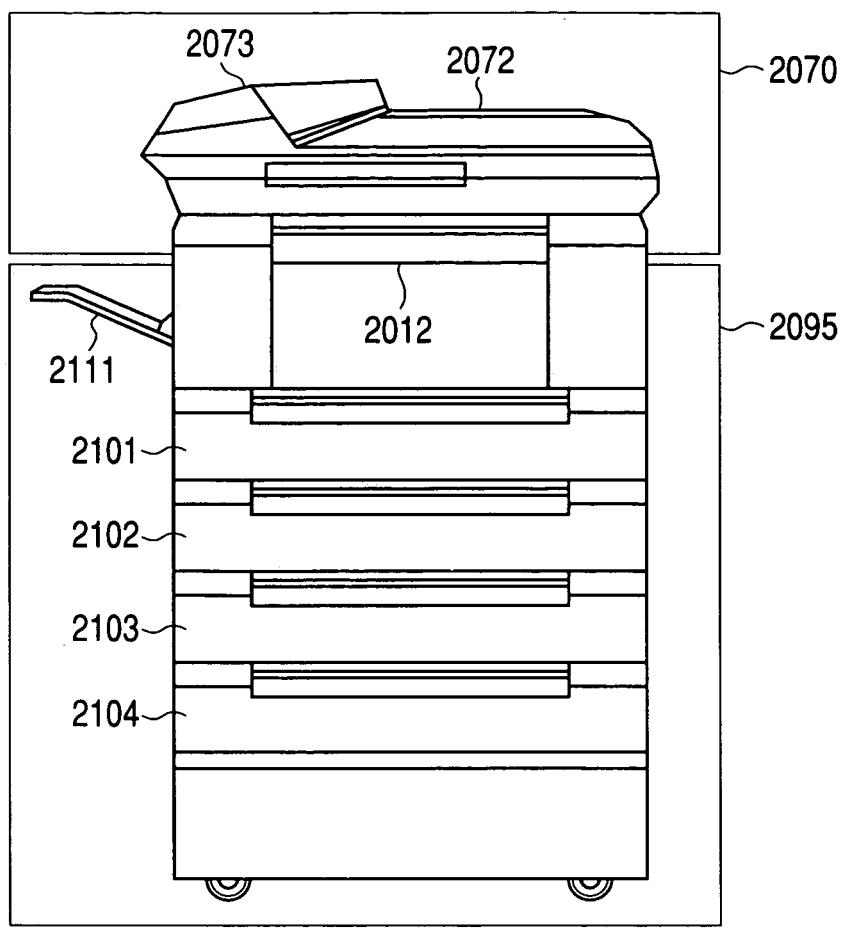
FIG. 3 is a schematic diagram showing image input and output devices (scanner and printer) which together structure the digital multifunctional apparatus shown in FIG. 2.

FIG. 3 is a schematic diagram showing the image input device (i.e., the scanner 2070) and the image output device (i.e., the printer 2095) which together structure the digital multifunctional apparatus 1001 shown in FIG. 2. In FIG. 3, the same numerals as those shown in FIG. 2 are applied respectively to the corresponding same parts as those shown in FIG. 2. Incidentally, the respective units included in the digital multifunctional apparatus 1001 are structured to be controllable by the CPU 2001.

As shown in FIG. 3, the scanner 2070 being the image input device illuminates an image on an original, scans it with a CCD line sensor (not shown), and then converts the scanned image into an electrical signal as the raster image data 2071 (FIG. 2). When the user sets original papers on a tray 2073 of an original feeder 2072 and instructs to start reading of original images from the operation unit 2012, an instruction is given to the scanner 2070 by the CPU 2001, the original paper is fed one by one by the original feeder 2072, and an original image reading operation is performed.

Besides, an original size sensor (not-shown) necessary to achieve a later-described automatic paper selection mode is provided in the original feeder 2072, whereby the size of the set original can be detected.

The printer 2095 being the image output device is the part to convert the raster image data 2096 (FIG. 2) into the image on the a recording paper. Here, the printer 2095 can adopt any of an electrophotographic method (a laser beam method, an LED method) using a photosensitive drum and a photosensitive member belt, an inkjet method of directly printing the image on the recording paper by emitting inks from a micro-nozzle array, a liquid crystal shutter method, a thermal-transfer method, a sublimation method, and the like. Incidentally, the print operation of the printer 2095 starts in response to an instruction (i.e., the raster image data 2096) from the CPU 2001.

Moreover, the printer 2095 contains plural paper feed stages so as to enable the user to select different paper sizes and different paper directions, whereby paper cassettes 2101, 2102, 2103 and 2104 respectively corresponding to the plural paper feed stages are provided. Numeral 2111 denotes a paper discharge tray on which the print-ended papers are discharged.

Figure 4:
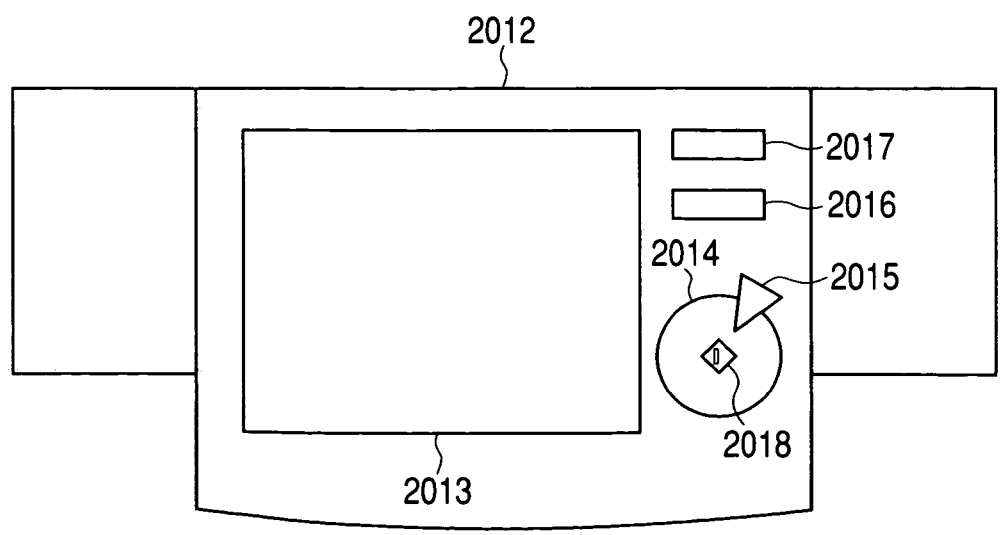
FIG. 4 is a plan view showing the configuration of an operation unit shown in FIG. 2.

FIG. 4 is a plan view showing the configuration of the operation unit 2012 shown in FIG. 2.

In FIG. 4, numeral 2013 denotes an LCD unit on which touch panel sheet including a system operation screen and various kinds of keys is adhered. When the key displayed on the LCD unit 2013 is depressed, the corresponding position information is transferred to the CPU 2001. Numeral 2014 denotes a start key which is used to start an operation such as the original image reading operation. Incidentally, red and green LED's 2018 are provided at the center of the start key 2014 to indicate whether or not the start key 2014 is available.

Numeral 2015 denotes a stop key which is used to stop the running operation, numeral 2016 denotes an ID (identification) key which is used to input a user ID, and numeral 2017 denotes a reset key which is used to initialize the setting from the operation unit.

The CPU 2001 controls the operation unit 2012 including the LCD unit 2013. For example, the CPU 2001 causes the LCD unit 2013 to selectively display the operation screen for selecting the local copy mode, the operation screen for selecting the remote copy mode, and the like in response to user's key operations. Moreover, the CPU 2001 causes the LCD unit 2013 to display a process condition setting screen (e.g., an operation screen of FIG. 21 for setting a page print mode and setting detailed setting parameters in the page print mode) for setting a print output process condition with respect to the job (i.e., the original image data) to be printed, in response to user's key operations. Furthermore, in the case where the remote copy mode is selected, when there are the plural printers capable of operating in the remote copy mode, the CPU 2001 causes the LCD unit 2013 to display a screen (e.g., an operation screen of FIG. 16) for selecting from among the candidates consisting of the above plural printers one printer for performing the remote copy operation.

As just described, the CPU 2001 also controls the display of the LCD unit 2013 of the operation unit 2012 so as to cause the relevant unit to perform the corresponding operation according to the user's instruction set through the operation screen.

Figure 5:
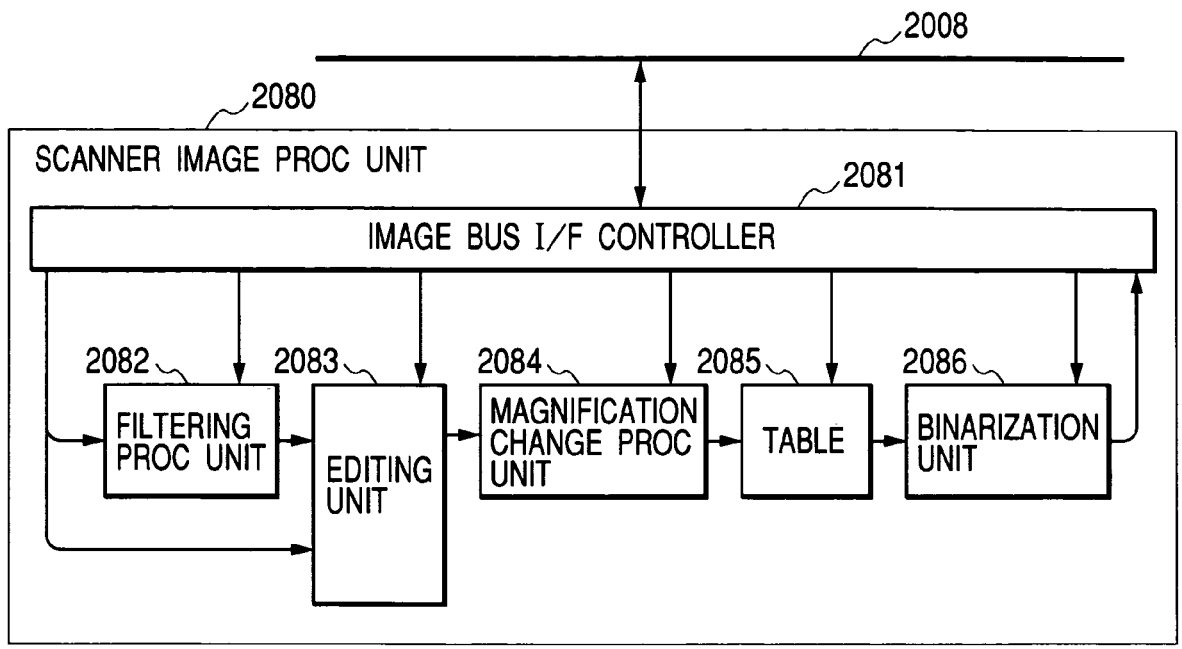
FIG. 5 is a block diagram showing the structure of a scanner image processing unit shown in FIG. 2.

FIG. 5 is a block diagram showing the structure of the scanner image processing unit 2080 shown in FIG. 2. In FIG. 5, the same numerals as those shown in FIG. 2 are respectively applied to the corresponding same parts as those shown in FIG. 2.

In FIG. 5, numeral 2081 denotes an image bus I/F (interface) controller which is connected to the image bus 2008 to control its bus access sequence. Further, the image bus I/F controller 2081 controls each unit in the scanner image processing unit 2080 and generates timing signals. Numeral 2082 denotes a filtering processing unit which performs convolution calculation with a spatial filter. Numeral 2083 denotes an editing unit which recognizes, e.g., a closed area surrounded by pen marking from the input image data and performs image processes such as shadowing, screening, negative/positive reversing and the like to the image data within the closed area.

Numeral 2084 denotes a magnification change processing unit. When the resolution of the read image is intended to be changed, the magnification change processing unit 2084 performs interpolation calculation in the main scan direction of the raster image to perform image enlargement/reduction. In the sub scan direction, the image enlargement/reduction is performed by changing the scan speed of an image reading line sensor (not shown). Numeral 2085 denotes a table which performs table conversion to convert the read image data being brightness data into density data. Numeral 2086 denotes a binarization processing unit which binarizes multivalued gray scale image data through an error diffusion process or a screen process. Then, the image data subjected to the above processes is again transferred to the image bus 2008 through the image bus I/F controller 2081.

Figure 6:
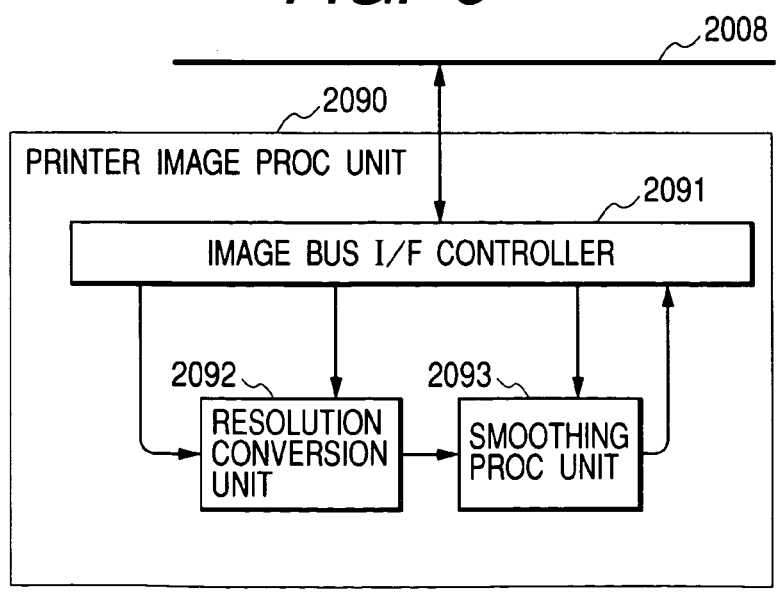
FIG. 6 is a block diagram showing the structure of a printer image processing unit shown in FIG. 2.

FIG. 6 is a block diagram showing the structure of the printer image processing unit 2090 shown in FIG. 2. In FIG. 6, the same numerals as those shown in FIG. 2 are respectively applied to the corresponding same parts as those shown in FIG. 2.

In FIG. 6, numeral 2091 denotes an image bus I/F controller which is connected to the image bus 2008 to control its bus access sequence. Further, the image bus I/F controller 2091 controls each unit in the printer image processing unit 2090 and generates timing signals. Numeral 2092 denotes a resolution conversion unit which performs resolution conversion to convert the resolution of the image data transmitted from the LAN 2011 or the WAN or public line 2051 into the resolution of the printer 2095. Numeral 2093 denotes a smoothing processing unit which performs a process to smooth jaggy (i.e., unevenness appearing on the B/W (black/white) boundary part) of the image data after the resolution conversion.

Figure 7:
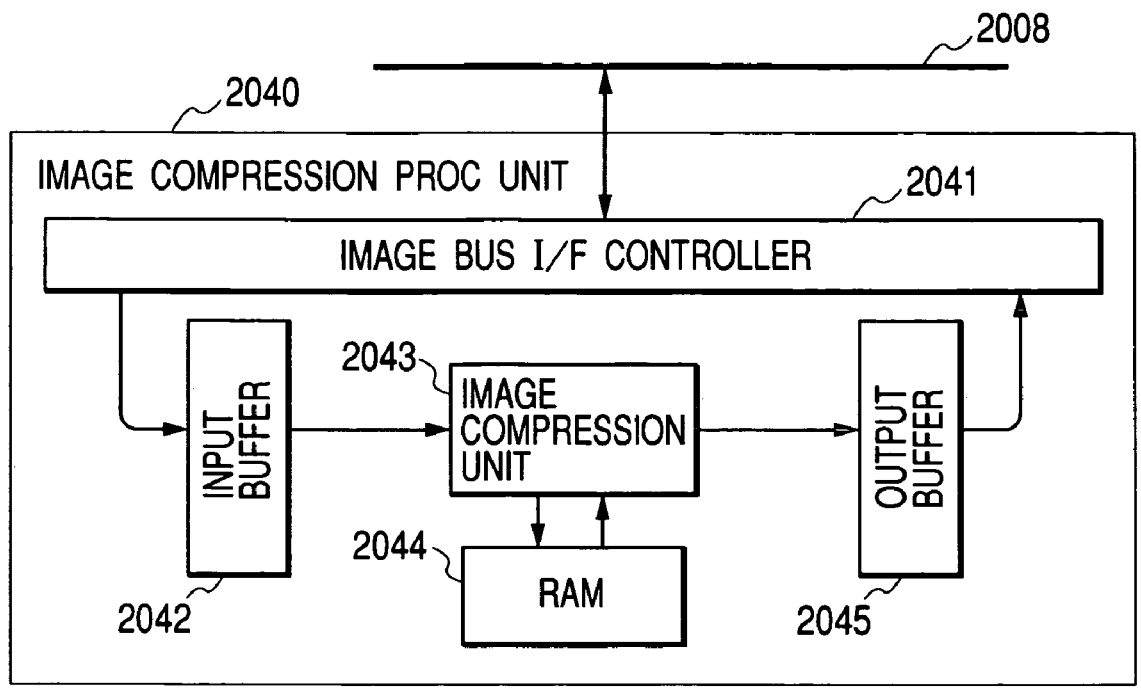
FIG. 7 is a block diagram showing the structure of an image compression processing unit shown in FIG. 2.

FIG. 7 is a block diagram showing the structure of the image compression unit 2040 shown in FIG. 2. In FIG. 7, the same numerals as those shown in FIG. 2 are respectively applied to the corresponding same parts as those shown in FIG. 2.

In FIG. 7, numeral 2041 denotes an image bus I/F controller which is connected to the image bus 2008 to control its bus access sequence. Further, the image bus I/F controller 2041 performs timing control to exchange data to/from an input buffer 2042 and an output buffer 2045, and also performs mode setting for an image compression unit 2043. Hereinafter, an image compression process of the image compression processing unit 2040 will be explained.

The setting for image compression control is performed from the CPU 2001 to the image bus I/F controller 2041 through the image bus 2008. By such setting, the image bus I/F controller 2041 performs necessary setting for the image compression (e.g., setting of MMR compression, setting of JBIG decompression, etc.) to the image compression unit 2043. After the necessary setting was performed, image data transfer permission is again issued from the CPU 2001 to the image bus I/F controller 2041. According to such permission, the image data transfer is started from the RAM 2002 or each device on the image bus 2008 by the image bus I/F controller 2041. The received image data is temporarily stored in the input buffer 2042 and then transferred at certain speed in response to an image data request of the image compression unit 2043. At this time, it is discriminated by the input buffer 2042 whether or not the image data can be transferred between the image bus I/F controller 2041 and the image compression unit 2043. When the image data reading from the image bus 2008 and the image data writing to the image compression unit 2043 are impossible, it is controlled not to perform the data transfer (such control is called "handshaking" hereinafter).

The received image data is temporarily stored in a RAM 2044 by the image compression unit 2043. This is because, in case of the image compression, the data of several lines are necessary according to a kind of the image compression process to be performed. Namely, the image compression of first one line can not be performed if the image data of several lines are not prepared. The image data subjected to the image compression is immediately transferred to the output buffer 2045. In the output buffer 2045, the handshaking for the image bus I/F controller 2041 and the image compression unit 2043 is performed, and the image data is transferred to the image bus I/F controller 2041.

By the image bus I/F controller 2041, the compressed (or decompressed) image data transferred is further transferred to the RAM 2002 or each device on the image bus 2008. Such a series of processes is repeated until the processing request comes not to be issued from the CPU 2001 (that is, until the process of the necessary number of pages ends) or a stop request is issued by the image compression unit 2043 (that is, until an error occurs in the compression or decompression).

Figure 8:
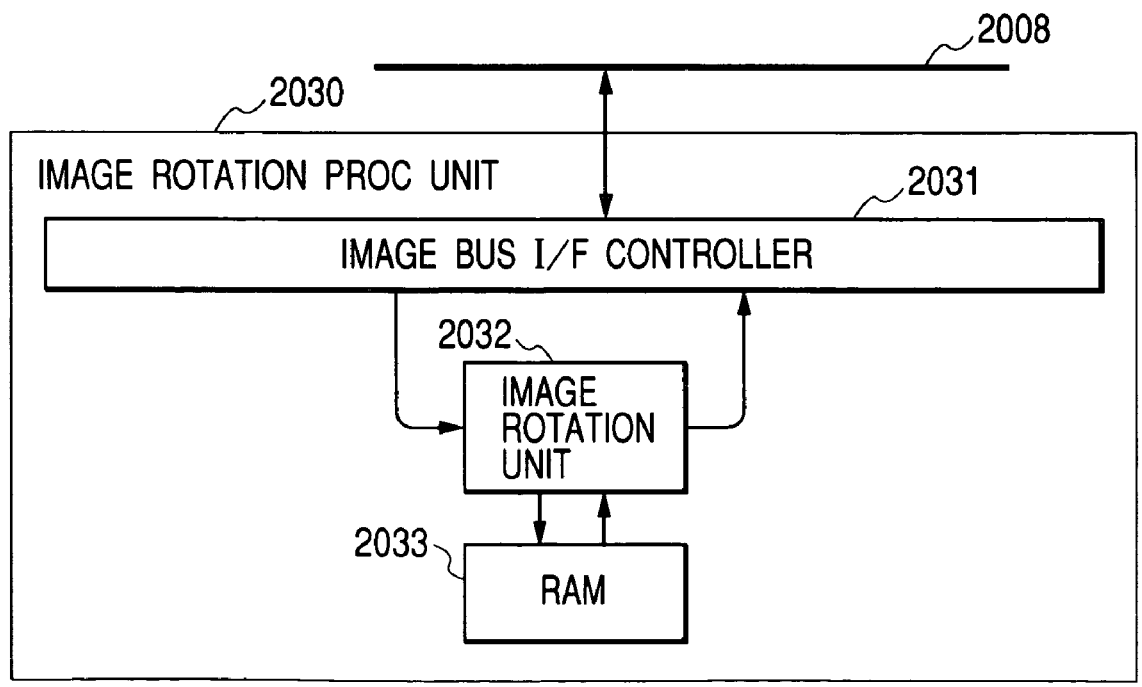
FIG. 8 is a block diagram showing the structure of an image rotation processing unit shown in FIG. 2.

FIG. 8 is a block diagram showing the structure of the image rotation processing unit 2030 shown in FIG. 2. In FIG. 8, the same numerals as those shown in FIG. 2 are respectively applied to the corresponding same parts as those shown in FIG. 2.

In FIG. 8, numeral 2031 denotes an image bus I/F controller which is connected to the image bus 2008 to control its bus access sequence. Further, the image bus I/F controller 2031 performs control to set a mode or the like for an image rotation unit 2032 and timing control to transfer image data to the image rotation unit 2032. Hereinafter, an image rotation process will be explained.

The setting for image rotation control is performed from the CPU 2001 to the image bus I/F controller 2031 through the image bus 2008. By such setting, the image bus I/F controller 2031 performs necessary setting for the image rotation (e.g., setting of an image size, a rotation direction, a rotation angle, etc.) to the image rotation unit 2032. After the necessary setting was performed, image data transfer permission is again issued from the CPU 2001 to the image bus I/F controller 2031. According to such permission, the image data transfer is started from the RAM 2002 or each device on the image bus 2008 by the image bus I/F controller 2031. Here, it is assumed that the image size to be rotated is 32×32 bits, and the image data transfer size from the RAM 2002 or each device on the image bus 2008 by the image bus I/F controller 2031 is 32 bits. Further, it is assumed that the image transfer is performed in units of 32 bits when the image data is actually transferred to the image bus 2008 (binary image is handled).

Figure 9:
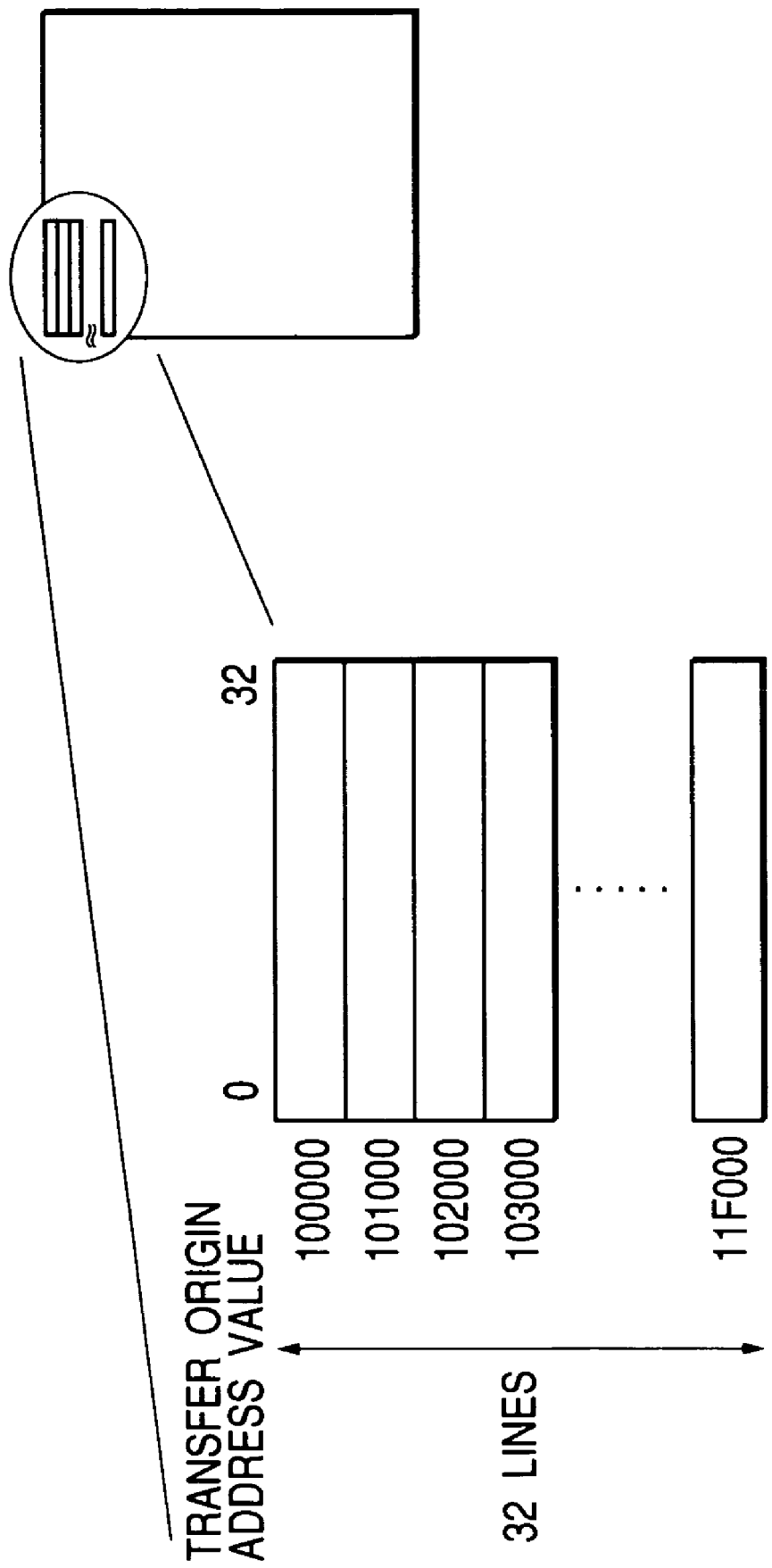
FIG. 9 is a diagram showing the operation of the image rotation processing unit shown in FIG. 2.

As described above, to obtain the image of 32×32 bits, it is necessary to perform the above 32-bit unit data transfer 32 times, and it is further necessary to transfer image data from discontinuous addresses, as shown in FIG. 9.

Figure 10:
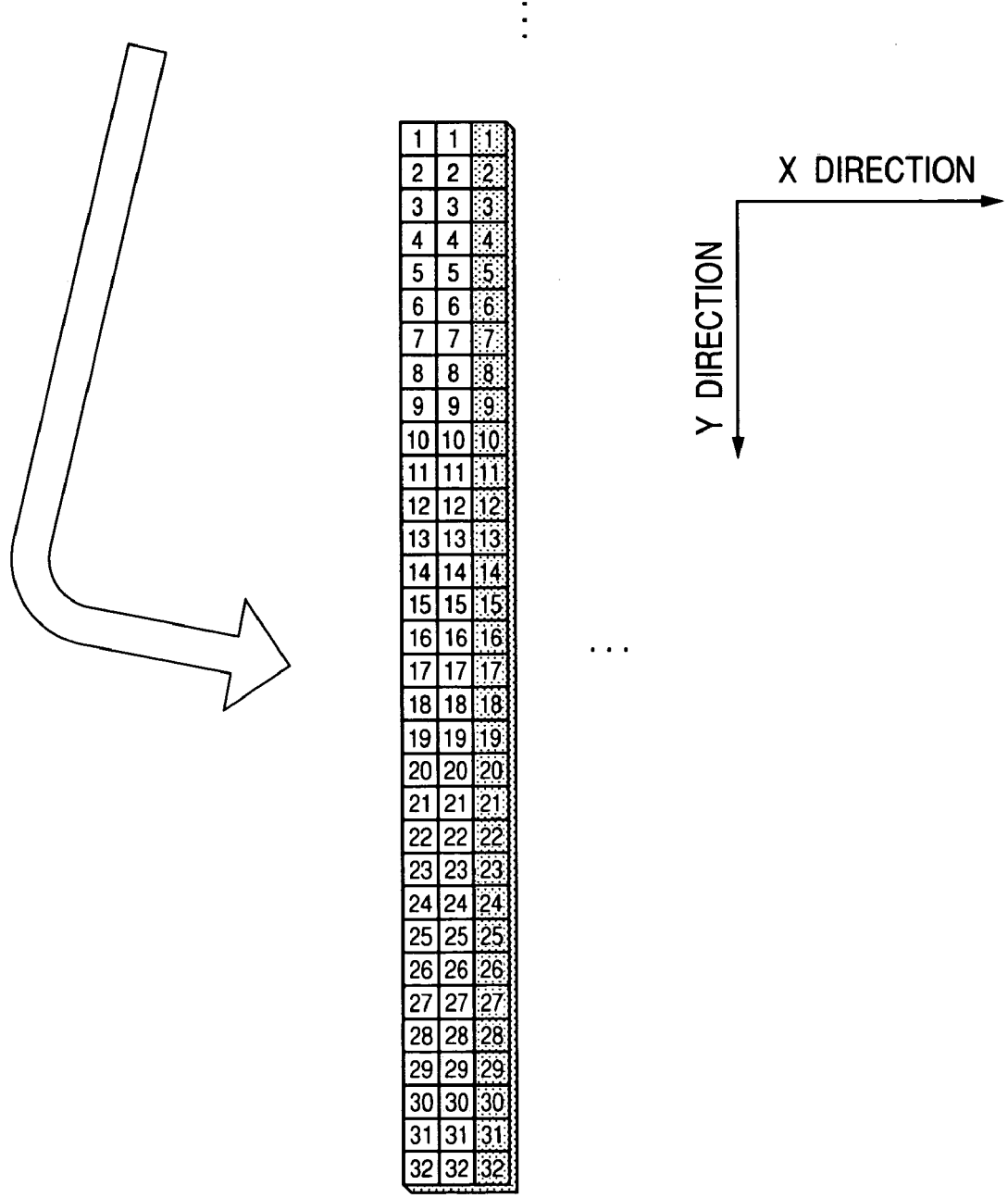
FIG. 10 is a diagram showing the operation of the image rotation processing unit shown in FIG. 2.

The image data transferred from the discontinuous addresses is written in a RAM 2033 so that the image data is rotated by a desired angle in case of reading the image. For example, in case of counterclockwise rotating the image by 90°, the 32-bit image data first transferred is written in the Y direction as shown in FIG. 10. Then, when the written data is read, the image is rotated by reading the data in the X direction of FIG. 10. Thus, the image is rotated.

After the image rotation of 32×32 bits (i.e., data writing in the RAM 2033) ended, the image data is read from the RAM 2033 in the above reading method by the image rotation unit 2032, and the read image data is transferred to the image bus I/F controller 2031.

The image bus I/F controller 2031 which received the rotation-processed image data performs continuous addressing to transfer the data to the RAM 2002 or each device on the image bus 2008.

Such a series of processes is repeated until the processing request comes not to be issued from the CPU 2001 (i.e., until the process of the necessary number of pages ends).

Figure 11:
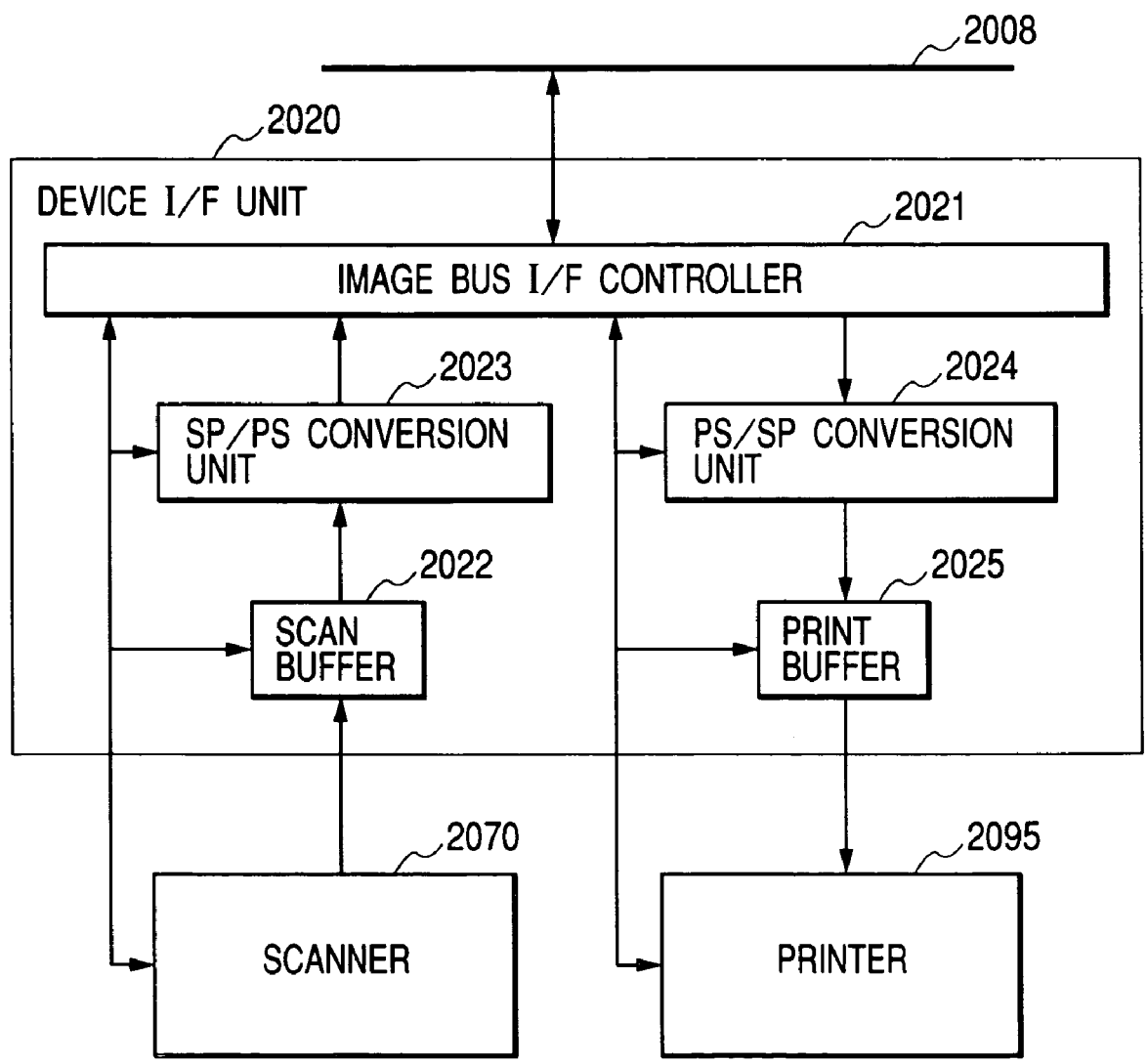
FIG. 11 is a block diagram showing the structure of a device I/F (interface) unit shown in FIG. 2.

FIG. 11 is a block diagram showing the structure of the device I/F unit 2020 shown in FIG. 2. In FIG. 11, the same numerals as those shown in FIG. 2 are respectively applied to the corresponding same parts as those shown in FIG. 2.

In FIG. 11, numeral 2021 denotes an image bus I/F controller which is connected to the image bus 2008 to control its bus access sequence. Further, the image bus I/F controller 2021 controls each unit in the device I/F unit 2020 and generates timing signals, and also generates a control signal to the external scanner 2070 and the printer 2095.

Numeral 2022 denotes a scan buffer which temporarily stores the image data transferred from the scanner 2070 and outputs the stored image data in synchronism with the image bus 2008. Numeral 2023 denotes an SP/PS (serial-to-parallel/parallel-to-serial) conversion unit which sorts (arranges) in due order or resolves (decomposes) the image data stored in the scan buffer 2022 so as to convert its data width into the data width of the image data capable of being transferred to the image bus 2008.

Numeral 2024 denotes a PS/SP (parallel-to-serial/serial-to-parallel) conversion unit which resolves (decomposes) or sorts (arranges) in due order the image data transferred from the image bus 2008 so as to convert its data width into the data width of the image data capable of being stored in a print buffer 2025. The print buffer 2025 temporarily stores the image data transferred from the image bus 2008 and outputs image data in synchronism with the printer 2095.

Next, a processing procedure of the device I/F unit 2020 in the image scan will be explained hereinafter.

The image data transferred from the scanner 2070 is stored in the scan buffer 2022 in synchronism with a timing signal also transferred from the scanner 2070. In a case where the image bus 2008 is the PCI bus, when the image data corresponding to 32 bits or more are entered in the buffer, the image data corresponding to 32 bits are transferred from the buffer to the SP/PS conversion unit 2023 in a first-in/first-out manner to convert them into 32-bit image data. Then, the obtained 32-bit image data is transferred to the image bus 2008 through the image bus I/F controller 2021. Moreover, in a case where the image bus 2008 is the IEEE1394 bus, the image data in the buffer is transferred to the SP/PS conversion unit 2023 in a first-in/first-out manner to convert it into serial image data. Then, the obtained serial image data is transferred to the image bus 2008 through the image bus I/F controller 2021.

Next, a processing procedure of the device I/F unit 2020 in the image printing will be explained hereinafter.

In the case where the image bus 2008 is the PCI bus, the image data corresponding to 32 bits transferred from the image bus 2008 and received by the image bus I/F controller 2021 are transferred to the PS/SP conversion unit 2024 and resolved (or decomposed) into the image data of which bit number corresponds to that of the input data of the printer 2095. Then, the obtained image data is stored in the print buffer 2025. Moreover, in the case where the image bus 2008 is the IEEE1394 bus, the serial image data transferred from the image bus 2008 and received by the image bus I/F controller 2021 are transferred to the PS/SP conversion unit 2024 and converted into the image data of which bit number corresponds to that of the input data of the printer 2095, and the obtained image data is stored in the print buffer 2025. Then, the image data in the buffer is transferred to the printer 2095 in a first-in/first-out manner in synchronism with a timing signal transferred from the printer 2095.

Figure 12:
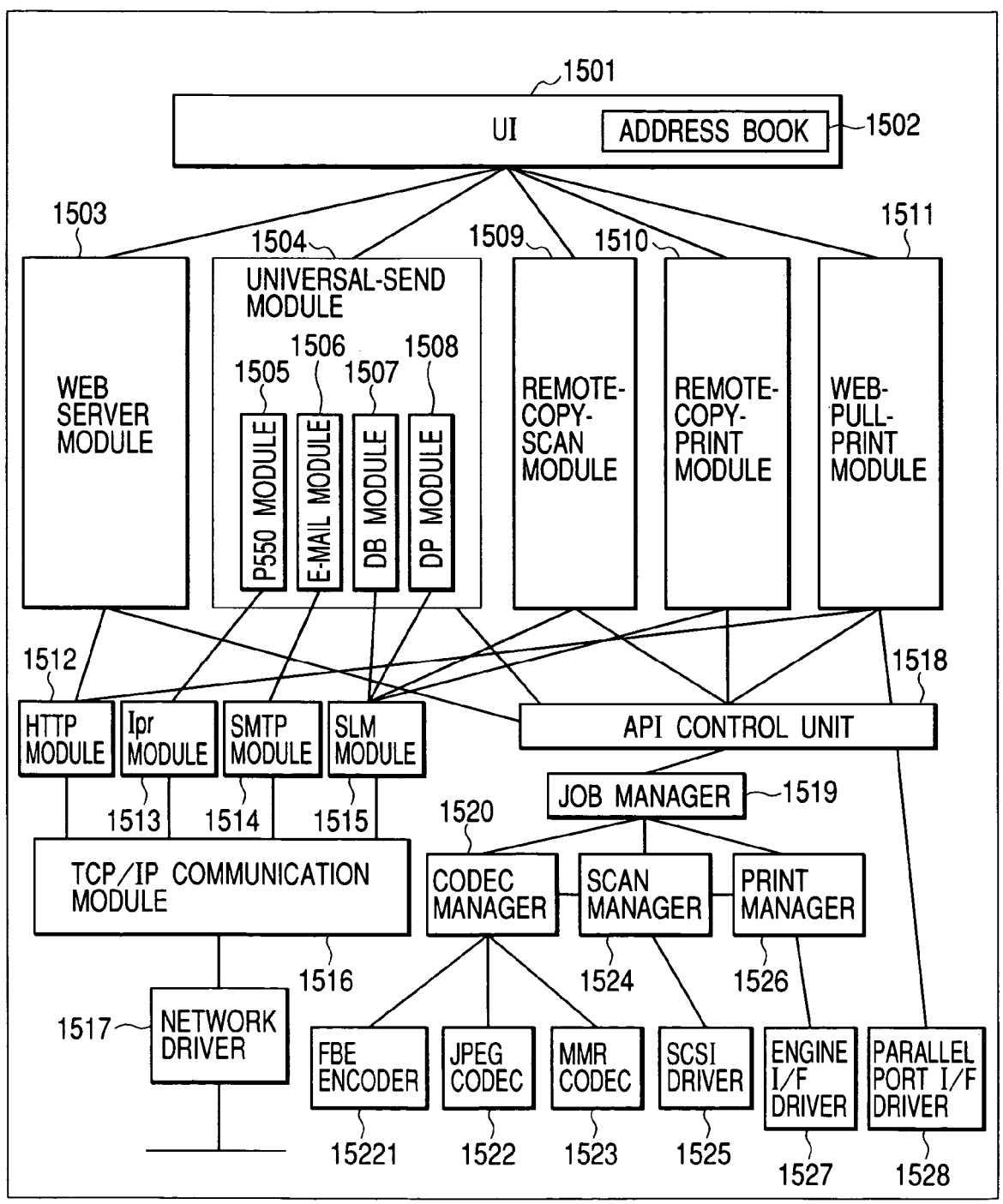
FIG. 12 is a software block diagram showing the entire configuration of software executed in the digital multifunctional apparatus shown in FIG. 2.

FIG. 12 is a software block diagram showing the entire configuration of software executed in the digital multifunctional apparatus 1001 shown in FIG. 2. It is assumed that the CPU 2001 executes the program stored in the ROM 2003, the HDD 2004, or another storage medium, and the software can be realized.

In FIG. 12, numeral 1501 denotes a UI (user interface) which is the module for intermediating between devices and the digital multifunctional apparatus when an operator performs various operations and settings on the digital multifunctional apparatus. The user interface 1501 transfers input information to various modules to be described later, and requests to execute the process, performs data setting or the like in accordance with the operations performed by the operator.

Numeral 1502 denotes an address book (Address-Book) which is a database module of managing a data sending destination, a communicating destination and the like. For the contents of the address book 1502, data addition, data deletion and data acquirement are performed by operations from the user interface 1501 to be used as the contents for giving information of the data sending destination and communicating destination to each of the modules to be described later in accordance with the operations performed by the operator.

Numeral 1503 denotes a web server (Web-Server) module which is used for notifying management information of the digital multifunctional apparatus 1001 in accordance with a request from a web client (not shown). The management information is read through an API (Application Program Interface) control unit (Control-API) 1518 to be described later and is notified to the web client through an HTTP (Hyper Text Transfer Protocol) module 1512, a TCP/IP (Transmission Control Protocol/Internet Protocol) communication module 1516 and a network driver (Network-Driver) 1517 which are to be described later.

Numeral 1504 denotes a universal-send (Universal-Send) module which is a module of managing data sending and is used for distributing data instructed by the operator through the user interface 1501 to the communicating (outputting) destination similarly instructed by the operator. When it is instructed to generate distribution data using a scanner function of the present apparatus by the operator, the universal-send module 1504 operates the apparatus through the API control unit 1518 to be described later and generates the data.

Numeral 1505 denotes a P550 module, of which the function is performed when a printer is designated as an outputting destination in the universal-send module 1504. Numeral 1506 denotes an E-mail module, of which the function is performed when an E-mail address is designated as a communicating destination in the universal-send module 1504. Numeral 1507 denotes a DB module, of which the function is performed when a database is designated as the outputting destination in the universal-send module 1504. Numeral 1508 denotes a DP module, of which the function is performed when a digital multifunctional apparatus similar to the present apparatus is designated as the outputting destination in the universal-send module 1504.

Numeral 1509 denotes a remote-copy-scan (Remote-Copy-Scan) module which executes a process identical to the copy function realized by the digital multifunctional apparatus 1001 itself by selecting another digital multifunction apparatus connected through a network or the like as the outputting destination using the scanner function of the digital multifunctional apparatus 1001.

Numeral 1510 denotes a remote-copy-print (Remote-Copy-Print) module which executes a process identical to the copy function realized by the digital multifunctional apparatus 1001 by selecting another digital multifunctional apparatus connected through the network or the like as an inputting destination using the printer function of the digital multifunctional apparatus 1001.

Numeral 1511 denotes a web-pull-print (Web-Pull-Print) module which reads out information of various home pages on an internet or an intranet and prints the read information.

The HTTP module 1512, which is used when the digital multifunctional apparatus 1001 performs communication by the HTTP, provides communication to the above-described web server module 1503 and the web-pull-print module 1511 by the TCP/IP communication module 1516 to be described later.

An lpr module 1513 provides communication to the printer module (P550 module) 1505 in the universal-send module 1504 by the TCP/IP communication module 1516 to be described later.

Numeral 1514 denotes an SMTP (Simple Mail Transfer Protocol) module which provides communication to the E-mail module 1506 in the universal-send module 1504 by the TCP/IP communication module 1516 to be described later.

Numeral 1515 denotes an SLM (Salutation-Manager) module which provides communication to the database (DB) module 1507 and the DP module 1508 in the universal-send module 1504, the remote-copy-scan module 1509 and the remote-copy-print module 1510 by the TCP/IP communication module 1516 to be described later.

The TCP/IP communication module 1516 provides network communication to the above-mentioned various modules by the network driver 1517 to be described later.

The network driver 1517 controls components physically connected to the network.

The API control unit 1518 provides an interface with downstream modules such as a job manager (Job-Manager) 1519 (to be described later) and the like for the upper stream modules such as the universal-send module 1504 and the like and decreases dependent relationship between the upper stream modules and the downstream modules to increase the diversity for the respective modules.

The job manager (Job-Manager) 1519 interprets processes instructed from the above-mentioned various modules through the API control unit 1518 and gives instructions to the respective modules to be described later. This module synthetically manages processes of hardware executed in the digital multifunctional apparatus 1001.

Numeral 1520 denotes a CODEC manager (CODEC-manager) which manages and controls various compressions and decompressions in the processes instructed by the job manager 1519.

Numeral 1521 denotes an FEB (First Binary Encoding) encoder (FEB-Encoder) which compresses data read by a scanning process executed by the job manager 1519 and a scan manager (Scan-Manager) 1524 by an FBE format.

Numeral 1522 denotes a JPEG CODEC (JPEG-CODEC) which executes a JPEG compression for the read data in a scanning process to be executed by the job manager 1519 and a scan manager (Scan-Manager) 1524 and a JPEG decompression process for print data in a printing process to be executed by a print manager (Print-Manager) 1526.

Numeral 1523 denotes an MMR CODEC (MMR-CODEC) which executes an MMR compression for the read data in the scanning process to be executed by the job manager 1519 and the scan manager 1524 and an MMR decompression for the print data in the printing process to be executed by the print manager 1526.

The scan manager (scan-Manager) 1524 manages and controls the scanning process instructed by the job manager 1519. Numeral 1525 denotes an SCSI driver which performs a communication, where the scan manager 1524 and the digital multifunctional apparatus 1001 communicate with an internally connected scanner unit.

The print manager (Print-Manager) 1526 manages and controls the printing process instructed by the job manager 1519. Numeral 1527 denotes an engine interface (Engine-I/F) driver which provides an interface between the print manager 1526 and a print unit.

Numeral 1528 denotes a parallel port I/F driver which provides an interface when the web-pull-print module 1511 outputs data to an output device (not shown) through a parallel port.

Hereinafter, an embodiment of the application software built into an image forming system, to which an image input apparatus and an image forming apparatus according to the present invention are applicable, will be explained with reference to FIG. 13.

Figure 13:
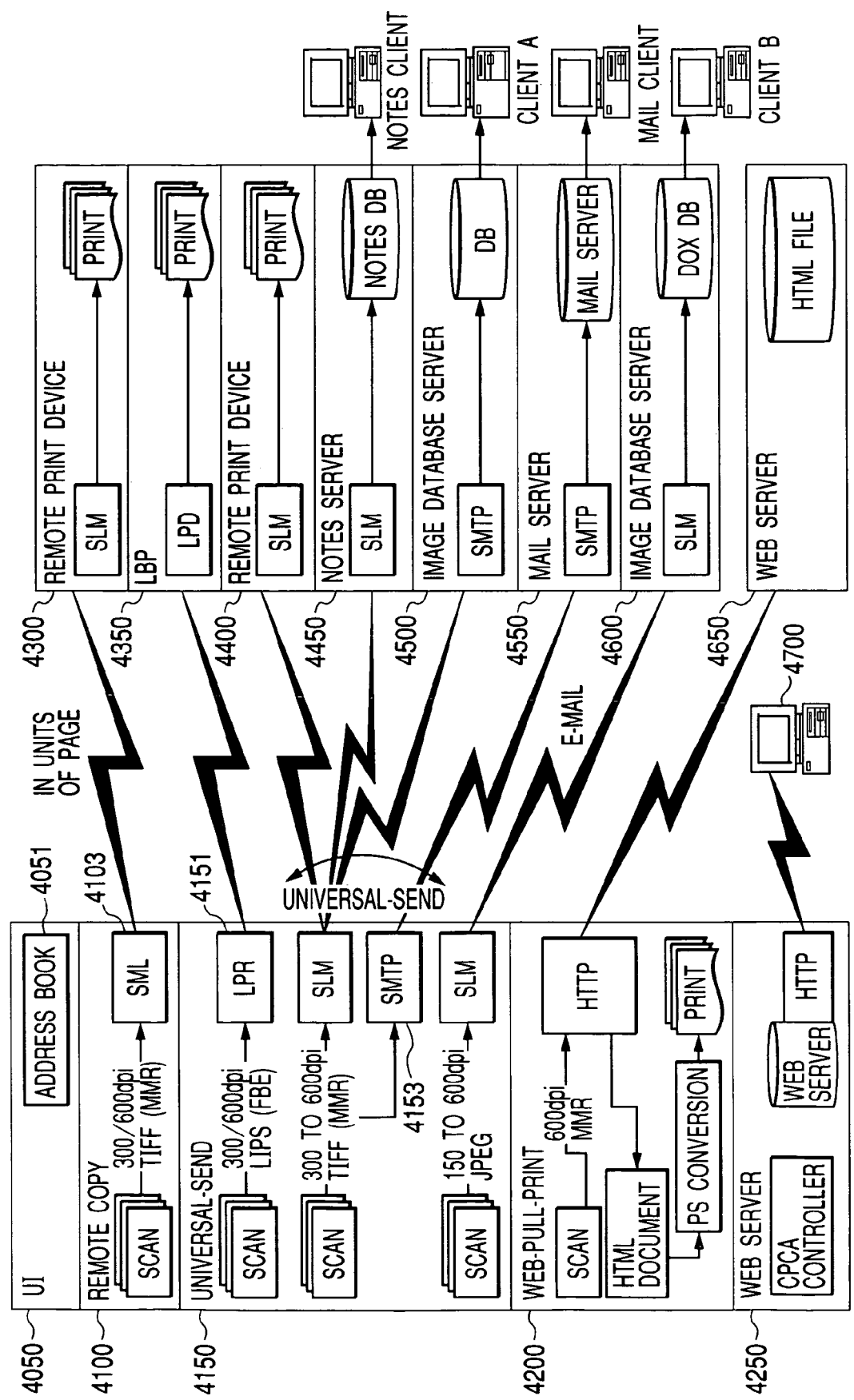
FIG. 13 is a block diagram showing a built-in application block concerning image sending in the image forming system to which the image input apparatus and the image output apparatus according to the present invention are applicable.

FIG. 13 is a block diagram showing a built-in application block concerning image sending in the image forming system to which the image input apparatus and the image output apparatus according to the present invention are applicable.

In FIG. 13, numeral 4050 denotes a block indicating the UI application software of an operation unit according to the embodiment explained in FIG. 12. Numeral 4100 denotes a block indicating a transmission side (for example, a device as a remote copy origin such as the digital multifunctional apparatus 1001 or the like) of the remote copy application software. Numeral 4150 denotes a block indicating a transmission side of the universal-send (Universal-Send). Numeral 4200 denotes a block indicating the web-pull-print (Web-Pull-Print) module. Numeral 4250 denotes a block indicating the web server (Web-Server) module.

Numeral 4300 denotes a block indicating a reception side (a remote print side, for example, another device as the remote copy destination such as a digital multifunctional apparatus 1020, a digital multifunctional apparatus 2902 or 2903, or the like) of the remote copy application software. Numeral 4350 denotes a block for receiving and printing image data transmitted by the universal-send by using a general-purpose printer. Numeral 4400 denotes a block indicating a reception side (a remote print side, for example, another device as the remote copy destination such as the digital multifunctional apparatus 1020, the digital multifunctional apparatus 2902 or 2903, or the like) of the remote print application software. Numeral 4450 denotes a block for receiving and storing the image data transmitted by the universal-send by using a known notes server (Notes-Server).

Numeral 4500 denotes a block for receiving and storing the image data transmitted by the universal-send by using an image database server. Numeral 4550 denotes a block for receiving and storing the image data transmitted by the universal-send by using a known mail server (Mail-Server). Numeral 4600 denotes a block for receiving and storing the image data transmitted by the universal-send as multi-level image data. Numeral 4650 denotes a block indicating a known web server (Web-Server) of containing information contents. Numeral 4700 denotes a known web browser (Web-Browser) for accessing to the web server or the like of the present invention.

Hereinafter, the application software groups will be explained in detail while referring to the respective blocks.

First, the UI application software 4050 (in this example, the UI application software 4050 is activated mainly for the operation unit 2012 of the digital multifunctional apparatus 1001 in the digital multifunctional apparatus 1001 under the control of the CPU 2001 of the digital multifunctional apparatus 1001 as an example of a remote copy origin device) will be explained.

As above, the detail of the UI application software 4050 has been explained. Here, an address book 4051 will be explained. This address book 4051 corresponds to the address book 1502 shown in FIG. 12 and is stored in a non-volatile storage device (non-volatile memory, hard disk or the like) in the digital multifunctional apparatus 1001. In this address book, features of devices connected to a network are described. For example, the features listed in the following items (a) to (h) are contained:

(a) formal name of a device or alias name;
(b) network address of the device;
(c) network protocol which can be processed by the device;
(d) document format which can be processed by the device;
(e) compression type which can be processed by the device;
(f) image resolution which can be processed by the device;
(g) paper size which can be fed and paper feed cassette information in case of a printer device; and
(h) folder name capable of storing the document in case of a server (computer) apparatus.

According to information described in this address book 4051, the remote copy application software 4100, the universal-send application software 4150, the web server application software 4250 and the web-pull-print application software 4200 can discriminate the features of the data sending destination. The address book 4051 can be edited and used by downloading data stored in a server computer or the like in the network or directly referred. Respective application software will be explained in detail.

Next, the remote copy application software 4100 will be explained.

The remote copy application software 4100 discriminates resolution information which can be processed by a device designated as the data sending destination from the contents of the address book 4051 and then compresses binary image data read by a scanner using the known MMR compression method in accordance with the discrimination to make the compressed data into data of the known TIFF (Tagged-Image-File-Format), and which is transmitted to the printer device on the network through an SLM module 4103. Although the detailed explanation will not be given, the SLM 4103 is a kind of network protocol containing device control information or the like called the salutation manager (Salutation-Manager) which was known and is also called a smart link manager (Smart-Link-Manager).

Next, the universal-send application software 4150 will be explained.

The universal-send application software 4150, which is different from the remote copy application software 4100, can transmits image data to the plural data sending destinations by image scanning performed in one time. Further, the data sending destination is not limited to only the printer device but the data can be directly transmitted to a so-called server computer. Hereinafter, the explanation will be given in due order of the data sending destinations.

When a device at the data sending destination discriminates that a process by an LPD (Line-Printer-Daemon) being the known network printer protocol and a process by a LIPS (Laser beam printer Image Processing System) known as a printer control command can be executed from the contents of the address book 4051, image data is read in accordance with the image resolution similarly discriminated from the contents of the address book 4051, and the image data itself is compressed using the known FBE (First-Binary-Encoding) method and further the compressed data is encoded into data of the LIPS format to transmit it to a partner device by an LPR (Line Printer daemon protocol) being the known network printer protocol.

In a case where a device at the data sending destination is a server apparatus which can communicate through the SLM module, a server address and designation of a folder in the server are discriminated from the contents of the address book 4051, and binary image data read by the scanner is compressed using the known MMR compression method similar to a case of the remote copy application software 4100 to make the compressed data into data of the known TIFF (Tagged-Image-File-Format), and thus processed data can be stored into a specific folder in the server apparatus on the network through the SLM module.

In the digital multifunctional apparatus 1001, when it is discriminated that the server being a partner apparatus can process multi-level image data compressed by the known JPEG (Joint Photographic coding Experts Group) compression method, image data (multi-level image data) which was read in multi-level is compressed using the known JPEG compression method similar to a case of the above-mentioned binary image data to make the compressed data into data of the known JFIF (JPEG-File-Interchange-Format), and thus processed data can be stored into a specific folder in the server on the network through the SLM module.

In a case where a device at the data sending destination is a known E-mail server, a mail address described in the address book 4051 is discriminated, and the binary image data read by the scanner is compressed using the known MMR compression method to make the compressed data into data of the known TIFF (Tagged-Image-File-Format), and thus processed data is transmitted to the E-mail server using a known SMTP (Simple-Mail-Transfer-Protocol) 4153. Thereafter, data sending processes are executed in accordance with instructions of the mail server 4550.

Next, the web-pull-print application software 4200 will be explained.

The web-pull-print application software 4200 reads information of various home pages on an internet or an intranet and prints the read information. The web server application software 4250 notifies management information of the own apparatus of a web client in response to a request from the web client.

Hereinafter, an image forming system which includes the digital multifunctional apparatus 1001 shown in FIG. 2 and in which a remote copy operation being the feature of the present invention is performed will be explained with reference to FIG. 14.

Figure 14:
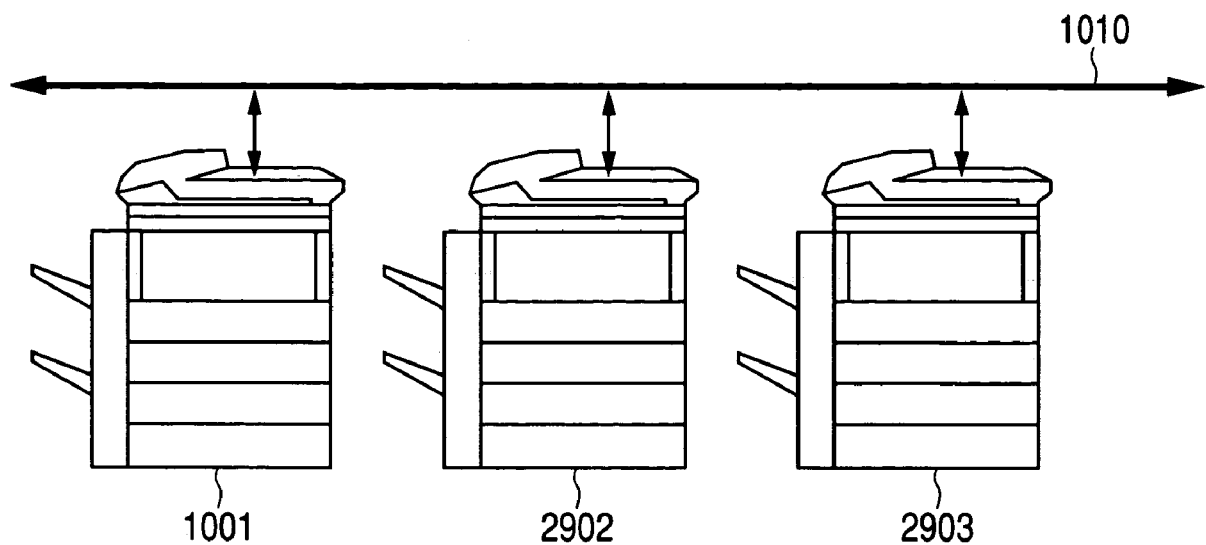
FIG. 14 is a diagram showing the structure of the image forming system which includes the digital multifunctional apparatus shown in FIG. 2 and in which a remote copy operation being the feature of the present invention is performed.

FIG. 14 is a diagram showing the structure of the image forming system which includes the digital multifunctional apparatus 1001 shown in FIG. 2 and in which the remote copy operation being the feature of the present invention is performed.

The image forming system shown in FIG. 14 is composed of the above-mentioned digital multifunctional apparatus 1001, the digital multifunctional apparatus 2902 and the digital multifunctional apparatus 2903 which are connected each other through a local area network 1011, and a communication for various data (image data to be printed, various processes conditions data, status command data, status data and the like) can be performed.

Figure 15:
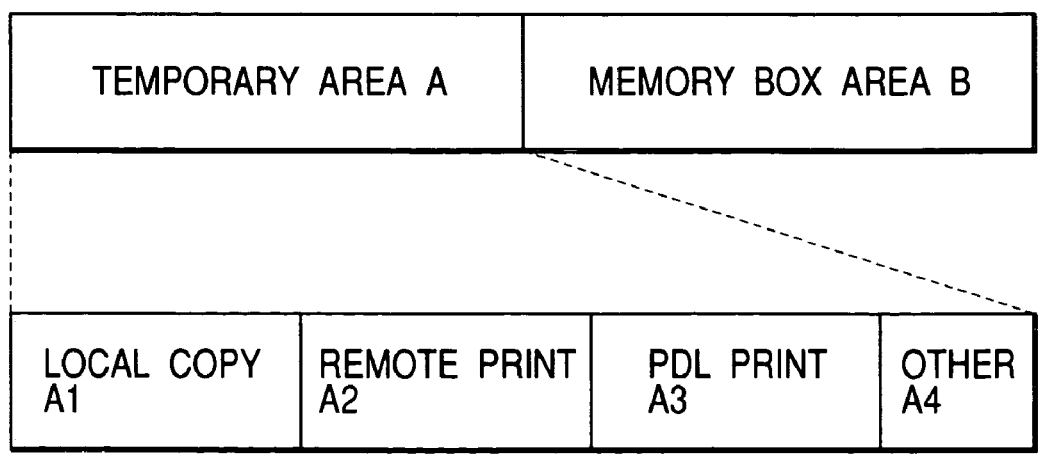
FIG. 15 is a diagram showing an allocation example of a storage area of a hard disk included in the digital multifunctional apparatus shown in FIG. 14.

FIG. 15 is a diagram showing an allocation example of a storage area of a hard disk 2004 (since the same structure, it is denoted by the same numeral) included in the respective digital multifunctional apparatuses 1001, 2902 and 2903 shown in FIG. 14. Each of the digital multifunctional apparatuses 1001, 2902 and 2903 includes the hard disk 2004 and has a local copy function and a remote copy function. That is, it is structured that the same function as that of other devices can be performed from any device. In an example to be described later, the example of executing a remote copy mode to other devices from the digital multifunctional apparatus 1001 is given.

As shown in FIG. 15, the storage area of the hard disk 2004 is divided into a temporary area A and a memory box area B.

The temporary area A is further divided into four areas A1 to A4. The area A1 is an area of temporarily storing image data for an electronic sorting process or the like when a local copy operation is performed (a case of printing image data read by a scanner of the own apparatus by a printer of the own apparatus). The area A2 is an area (remote area) of temporarily storing image data for a remote copy reception print (a case of printing image data received from another digital multifunctional apparatus by a printer of the own apparatus). The area A3 is an area of temporarily storing image data for a PDL (Page Description Language) reception print (a case of printing PDL data received from an external apparatus such as a host computer or the like by a printer of the own apparatus). The A4 is an area of temporarily storing image data for other functions. The memory box area B is an area of registering image data. In case of executing the remote copy mode of printing image data acquired in the own apparatus through a scanner unit of the own apparatus or a communication unit of the own apparatus using a printer unit of another device (for example, the digital multifunctional apparatus 2902 or 2903), for example, it is structured that any area between the temporary area A and the memory box area B in the hard disk 2004 can be utilized, and a memory control can be executed by the CPU 2001.

Figure 16:
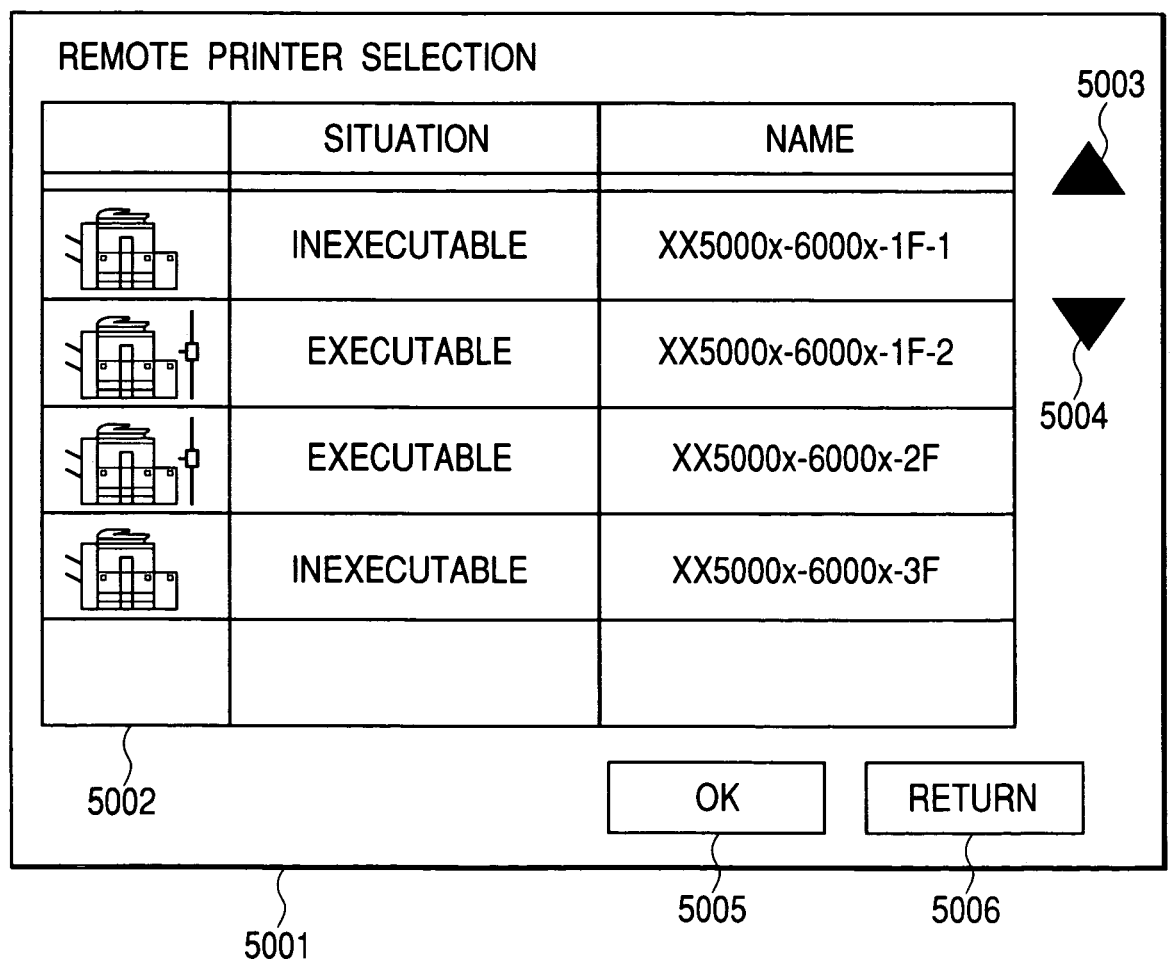
FIG. 16 is a diagram showing an example of a remote printer selection screen to be displayed on an LCD (liquid-crystal display) unit of an operation unit shown in FIG. 4 and provided in a transmission-side apparatus, in case of performing remote printing.

FIG. 16 is a diagram showing an example of a remote printer selection screen to be displayed on an LCD unit 2013 of the operation unit 2012 shown in FIG. 4 and provided in a transmission-side apparatus, in case of performing a remote printing operation. Here, an example of transmitting the image data from the digital multifunctional apparatus 1001 as a remote copy origin to another device (for example, the digital multifunctional apparatus 2902 or 2903) being a remote copy destination and printing the image data by a printer unit of the another device, will be explained.

In FIG. 16, numeral 5001 denotes a remote printer selection screen, which is displayed on the LCD unit 2013 in response to an operation of depressing a remote printer selection key on an operation screen (not shown) to be displayed on the LCD unit 2013 of the operation unit 2012 in the digital multifunctional apparatus 1001 shown in FIG. 4 by a user, under the control of the CPU 2001.

In the remote printer selection screen 5001, numeral 5002 denotes a remote printer table which is used for selecting a printer of performing the remote printing operation. It is assumed that general views of printers, the status (whether or not the remote printing operation can be performed) of the printers and names of the printers are displayed on the remote printer table 5002. The remote printer table 5002 can be scrolled up and down by an up-scroll key 5003 and a down-scroll key 5004. In this example, a display screen example, which is used for notifying a fact that four devices exist as the expected devices (i.e., the candidates of device) at the remote copy destinations, notifying names of the four expected devices and notifying a fact that the two devices among the four devices are in the state not capable of performing a printing operation and the remaining two devices are in the state capable of performing the printing operation and are selectable expected devices capable of performing the remote copy operation to the user through the operation unit of the digital multifunctional apparatus 1001 being the remote copy origin, is shown. With respect a displaying method in which how the CPU 2001 performs to display this display screen, for example, the registration setting for the expected devices and names thereof is previously performed by the user through the operation unit 2012 when the CPU 2001 grasps the expected devices at the remote copy destination and the names thereof, and information of the devices is displayed on the display screen on the basis of the registered information of the devices. When the CPU 2001 grasps an operation status of each device, the CPU 2001 transmits status request data used for requesting status information to each of the devices through a communication unit and collects the status information from the each device as replying data for the status request data. Thereby, it is structured that the operation status of the each device can be grasped and displayed. Further, it is structured that the remote copy destination can be determined by the user through the screen 5001 and any device can be selected from the expected devices (in this example, second and third devices) capable of performing the remote copy operation displayed in a device list display area. When any device is selected by the user, the CPU 2001 reversely displays a display line of the corresponded device and fixes the remote copy destination in response to action of depressing an OK key 5005 by the user with status of a reversal display.

The OK key 5005 is used for selecting any printer from the remote printer table 5002. When this key is depressed (an instruction is given), a printer selected from the remote printer table 5002 is set as a remote printer. Numeral 5007 denotes a return key, and when this key is depressed (an instruction is given), the remote printer is not selected and a screen returns to a precedence screen (a screen displayed on the LCD unit 2013 before the corresponded screen such as an initial screen of the copy mode, or the like).

Hereinafter, a remote printing process in the image forming system to which the image input apparatus and the image output apparatus according to the present invention are applicable will be explained with reference to FIGS. 17 to 20.

In the system shown in FIG. 14, an explanation will be given by using an example, where a control is performed by the CPU 2001 included in the digital multifunctional apparatus 1001 such that a printing process is executed by a printer unit of the device (in this example, the digital multifunctional apparatus 2903) at the remote copy (also called a remote print or a remote output) destination by transmitting image data (also called print data, word data or job data simply), which is selected by the user through a job selection screen (not shown) to be displayed on the LCD unit 2013 among plural image data stored into the memory box area B in the hard disk 2004 included in the digital multifunctional apparatus 1001, to another device (here, it is assumed that the digital multifunctional apparatus 2903 is designated by using the remote printer table 5002 shown in FIG. 16) which was selected by the user through a remote copy device selection screen (the screen 5001 shown in FIG. 16) to be displayed on the LCD unit 2013.

The digital multifunctional apparatus (the apparatus 1001, 2902 or 2903) according to the embodiment is structured that plural image data, which was input through any of the scanner unit 2070 in the own apparatus and a communication unit such as the network unit 2010, the MODEM 2050 or the like, can be registered in the memory box area B in the hard disk 2004 included in the own apparatus, and desired image data is selected among the image data in the box area by the user through the job selection screen (not shown) to be displayed on the LCD unit 2013, and the function (box function) of printing the selected image data by a printer unit of the own apparatus, transmitting the selected image data to another device through the communication unit of the own apparatus or printing the selected image data by a printer unit of another device according to an instruction from the user set by the operation unit 2012 is equipped. That is, a desired job (original image data) stored in the box area B can be output by the remote copy operation.

Figure 17:
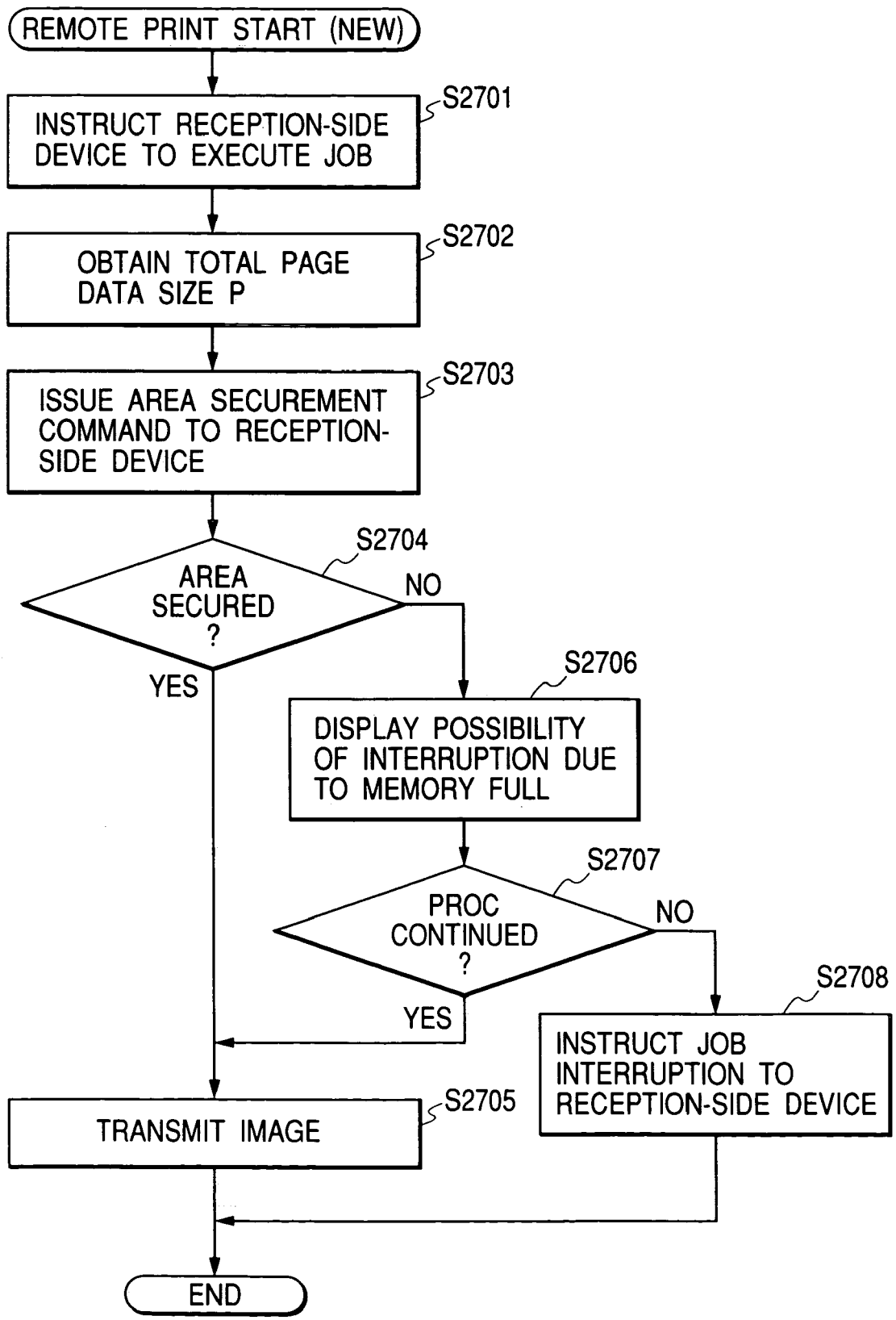
FIG. 17 is a flow chart showing an example of a first control processing procedure in the image forming system to which the image input apparatus and the image output apparatus according to the present invention are applicable.

FIG. 17 is a flow chart showing an example of a first control processing procedure in the image forming system to which the image input apparatus and the image output apparatus according to the present invention are applicable. The process indicated in FIG. 17 corresponds to a process executed at a transmission side (here, the digital multifunctional apparatus 1001) when the remote print operation (in this embodiment, also called the remote copy operation) is performed. It is assumed that the process indicated in this flow chart is synthetically controlled and executed by the CPU 2001 on the basis of the program stored in the ROM 2003, the HDD 2004 shown in FIG. 2 or another storage medium. As a premise, it is assumed that the remote copy mode is set by the user through various operation screens (for example, various operation screens shown in FIGS. 23A to 23E to be described later) displayed on the LCD unit 2013 and various print process conditions have been set. Reference symbols S2701 to S2708 indicate respective steps.

First, when the remote print operation of using the digital multifunctional apparatus 2903 is instructed to the image data in the memory box area B in the hard disk 2004 included in the digital multifunctional apparatus 1001, an execution of a remote print job is notified to the digital multifunctional apparatus 2903 at a reception side (S2701). As the contents of the job execution notification, there is job mode data including original direction detected result information (including first information concerning the above-mentioned original direction and second information concerning a kind of an original) With respect to the original direction detected result information, it is assumed that the original direction detecting unit 2500 detects information concerning the original direction of the image data in the memory box area B every page and acquires the information in a process (not shown) before the step S2701 when it is instructed to start a job upon designating an image process necessary for the original direction.

In the embodiment, when the remote copy mode for the digital multifunctional apparatus 2903 as an example of the remote copy destination is set by the user through a user interface (the operation unit 2012, the LCD unit 2013 or the like) of the digital multifunctional apparatus 1001 as an example of the remote copy origin, the CPU 2001 as a controller of the digital multifunctional apparatus 1001 controls to transmit original image data itself, to which the remote copy operation has to be performed, from the digital multifunctional apparatus 1001 to the digital multifunctional apparatus 2903 through the communication unit and controls to transmit also the job mode data while associating it with the original image data as above.

The job mode data, which is to be transmitted to the digital multifunctional apparatus 2903 as an example of the remote copy destination through the communication unit by the CPU 2001 of the digital multifunctional apparatus 1001 as an example of the remote copy origin according to the embodiment, includes at least two kinds of data which are output process condition data and original direction detecting data. The output process condition data is, for example, print output condition data (for example, process condition data or the like set by the user among plural process conditions which can be set in the digital multifunctional apparatus 1001 such as process condition data concerning the number of printing papers, process condition data concerning original size, process condition data concerning paper size, process condition data concerning a post-process such as a staple process, a punch process, a folding process or the like, process condition data concerning a reduction layout mode such as Nin1 mode or the like, process condition data concerning a page number print mode of giving a page number on a sheet (paper) on which an input original image data (to be described later) is recorded, process condition data concerning an editing process such as an image rotation process, an image reduction process, an image enlargement process or the like) set based on the user setting for specifying that original image data to which the remote copy operation is performed is to be printed by what kind of output form. The original direction detecting data (includes original direction information of the original image data for specifying that the original image data to be processed was input by what kind of direction, upper and lower sides, right and left sides as above and original kind information for specifying that a kind of the original image data is longitudinal-long original type or lateral-long original type) is information set based on a detecting result acquired by the original direction detecting unit 2500.

The CPU 2001 sets the above-mentioned output condition data as job data for the original image data to be processed on the basis of an output condition set by the user through the operation unit 2012 and sets the above-mentioned original direction detecting data as the above-mentioned job data on the basis of original direction detecting information of the original image data to be processed detected by the original direction detecting unit 2500.

The CPU 2001 controls to store the original direction detecting data into the hard disk while respectively associating it with the job every each job of plural jobs (image data) which were stored into the hard disk 2004 having the memory box area as above. For example, when a reading process of the original image is executed by a reader unit of the digital multifunctional apparatus 1001 and the read image data is stored into the memory box area, the CPU 2001 controls the reader unit to execute the original reading process and controls the original direction detecting unit 2500 to execute an original direction detecting process for the original image data, and controls to store the read original image data and the original direction detecting data of the original image data into the hard disk 2004 while associating the read original image data with the original detecting data.

Further, the CPU 2001 controls to store the output condition data into the hard disk while respectively associating it with the job every each job of plural jobs (image data) which were stored into the hard disk 2004 having the memory box area as above. For example, when the input original image data is stored into the hard disk 2004 (when an input process is executed), in a case that the output condition is set by the user through the operation unit, the CPU 2001 stores the output condition data into the hard disk 2004 while associating it with the original image data. When the registered image data is read out from the hard disk 2004 to perform an output process (when an output process is executed), in a case that the output condition is set by the user through the operation unit, the CPU 2001 controls to execute a process according to the output condition for the image data which was read out from the hard disk 2004.

By executing such a process, the job data of the original image data, which was read out from the memory box area, can be generated and output, and the CPU 2001 controls to transmit the original image data from the remote copy origin (also called a device at a local side, for example, the digital multifunctional apparatus 1001 or the like) to the remote copy destination (also called a device at a remote side, for example, the digital multifunctional apparatus 2903) through the communication unit or the like, and controls to transmit the job data containing the output condition data and the original direction detecting data for the original image data to the remote copy destination through the communication unit or the like while corresponding the job data to the original image data, and controls to output the output image data, to which a process based on information contained in the job data is executed, by an output unit such as the printer unit or the like at the remote copy destination for the original image data at the remote copy destination.

In the embodiment, as above, the original image data (registered image data) held in the memory box area in the hard disk 2004 can be processed in the remote copy mode (in this case, an input process does not synchronize with an output process) and a job (image data) newly executed for the device through the input unit (for example, the scanner unit 2070) can be also output in the remote copy mode. In this case, the input process and the output process are synchronously executed in real-time. As a processing procedure, for example, a selection of the remote copy mode and setting of detailed print output conditions in the remote copy mode for the corresponded job are to be performed by the user operation through the operation unit 2012 during a period until the input process of the original image data ends including a period before the input process of the original image data is executed by the scanner unit 2070. The CPU 2001 controls the input unit to execute an input process of the original image data to which the remote copy operation is executed and controls the original direction detecting unit 2500 to execute the original direction detecting process of the original image data which was input. Then, the input original image data are sequentially stored in the hard disk 2004 while associating the output process condition data with the original direction detecting data, and it is controlled to transfer the original image data to the remote copy destination (for example, the digital multifunctional apparatus 2903 or the like) through the communication unit together with the output process condition data as the job data and the original direction detecting data. Then, the original image data is processed on the basis of the original direction detecting data and the output process condition data at the remote copy destination to perform a printout. As a data transmission method in this case, it may be controlled that the input original image data is transmitted to the remote copy destination in real-time in units of page or it may be controlled that all pages of the original image data to be processed are once stored into the hard disk 2004 of the own apparatus and then the image data for the all pages is collectively transmitted to the remote copy destination at one time. Anyway, the data is transmitted while associating it with the job data.

Next, an image size necessary for designated word data is acquired, and a total image size P (total page data size P) to be transmitted to the digital multifunctional apparatus 2903 at the reception side is calculated (S2702). The above data size information can be acquired by checking that what amount of data is included by the job in a case that, for example, the corresponded job data was stored into the hard disk 2004. Next, an area securement command necessary for the total page data size P is issued for the digital multifunctional apparatus 2903 at the reception side (S2703).

Next, the flow advances to the step S2704, where it is judged whether or not the area is secured based on a reply result for the area securement command sent from the digital multifunctional apparatus 2903 at the reception side. When it is judged that the area is secured, the flow advances to the step S2705, where the image data is read out from the memory box area B on the hard disk 2004, and the image data and job mode data including the output process condition data and the original direction detecting data for the image data are transmitted to the digital multifunctional apparatus 2903 at the reception side and then the process ends. It should be noted that it may be structured that, for example, the job mode data corresponding to the original image data, to which the remote copy operation is performed, is not transmitted to the remote copy destination in this process step but may be transmitted to the remote copy destination in the process step in the step S2701. Anyway, such a structure, where the image data and the job mode data are dealt with appropriately in the digital multifunctional apparatus 2903 at the reception side, is applicable.

Figure 18:
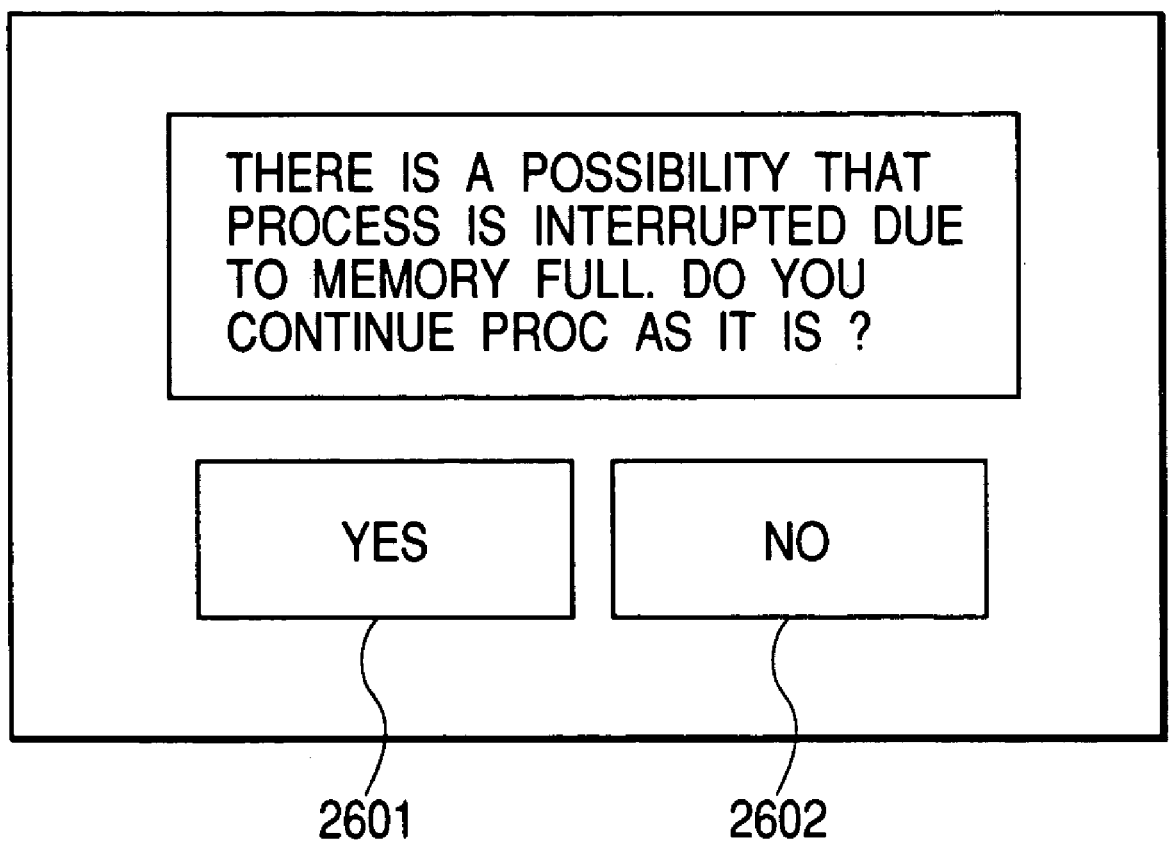
FIG. 18 is a diagram showing an example of a message screen which is displayed on the LCD unit of the operation unit shown in FIG. 4 and displays that there is a possibility of process interruption due to memory full.

While, in the step S2704, when it is judged that the area is not secured based on the reply result for the area securement command sent from the digital multifunctional apparatus 2903 at the reception side, a selection screen used for selecting continuance or discontinuance of the process is displayed on the LCD unit 2013 on the operation unit 2012 including a message of indicating possibility of interruption due to memory full as shown in FIG. 18 (S2706) and then the flow advances to the step S2707.

In the step S2707, when it is judged that the continuance of the process is selected by depressing a "YES" key 2601 on the selection screen shown in FIG. 18, the flow advances to the step S2705, where the image data is read out from the memory box area B on the hard disk 2004, and the image data and the job mode data including the output process condition data for the image data and the original direction detecting data of the original image data are transmitted to the digital multifunctional apparatus 2903 at the reception side and then the process ends. In this manner, it is structured that remote copy job data can be transmitted after acquiring confirmation of transmission approval by the user at the transmission side even if such a state of not ending the process occurs at the reception side.

While, in the step S2707, when it is judged that the discontinuance of the process (the process ends) is selected by depressing a "NO" key 2602 on the selection screen shown in FIG. 18, the flow advances to the step S2708, where interruption of the process is notified to the digital multifunctional apparatus 2903 at the reception side and then the process ends (inhibit the execution of the remote copy mode).

Figure 19:
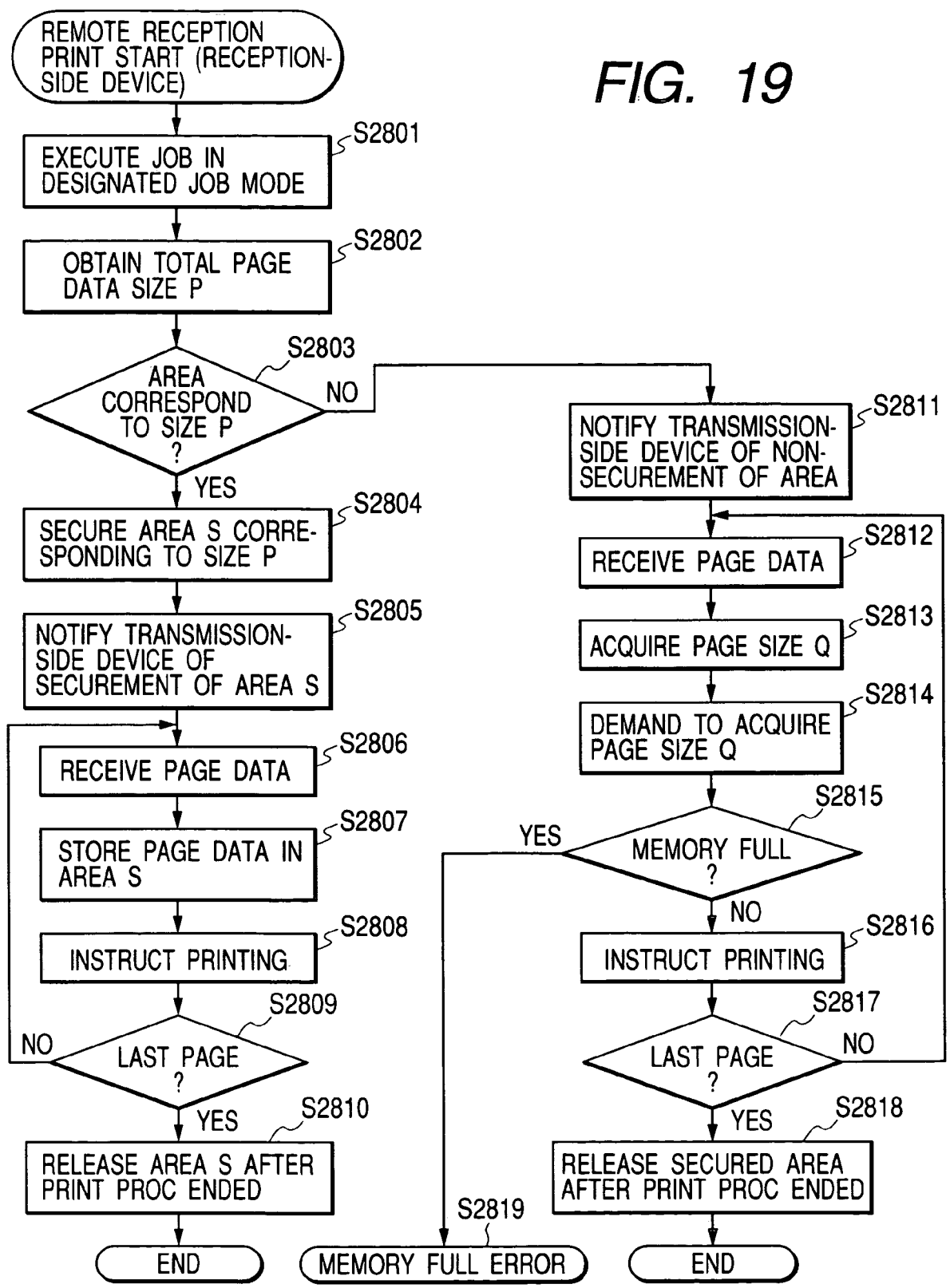
FIG. 19 is a flow chart showing an example of a second control processing procedure in the image forming system to which the image input apparatus and the image output apparatus according to the present invention are applicable.

FIG. 19 is a flow chart showing an example of a second control processing procedure in the image forming system to which the image input apparatus and the image output apparatus according to the present invention are applicable. The process shown in this flow chart corresponds to a process executed at the reception side (in this example, the digital multifunctional apparatus 2903 which receives a remote copy job from the digital multifunctional apparatus 1001) when the remote print operation is performed. It is assumed that the process shown in this flow chart is synthetically executed by the CPU 2001 on the basis of the program stored in the ROM 2003, the HDD 2004 shown in FIG. 2 or another storage medium. Reference symbols S2801 to S2819 denote respective steps.

Figure 20:
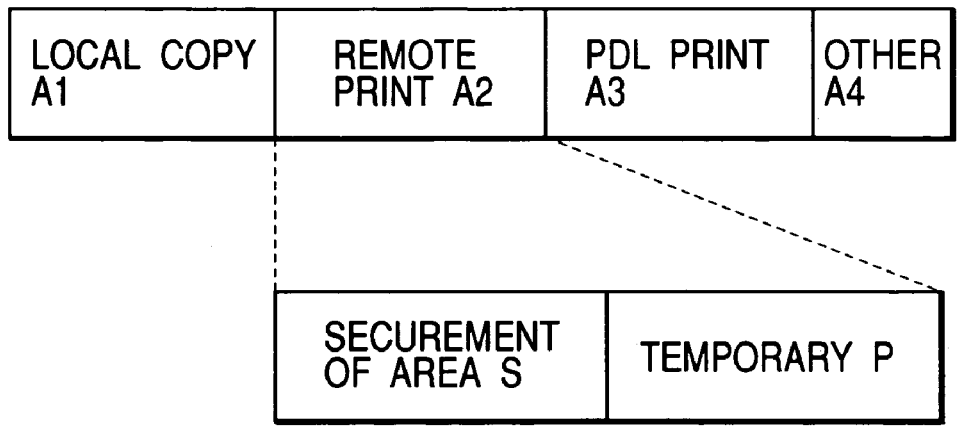
FIG. 20 is a diagram showing an allocation example of a remote print area of the hard disk included in the digital multifunctional apparatus shown in FIG. 15.

First, when a remote print instruction is received from the digital multifunctional apparatus 1001 at the transmission side, it is instructed to execute a job in a designated job mode (S2801). Next, the total image size P (total page data size P) designated from the transmission-side device (the digital multifunctional apparatus 1001 at the transmission side) is acquired upon receiving the area securement command (S2802). Next, it is judged whether or not an area corresponding to the total page data size P exists in the remote print area A2 on the hard disk 2004 (S2803), and when it is judged that the area exists, an area S corresponding to the total image size P is reserved and secured from the remote print area A2 as shown in FIG. 20 (S2804).

Next, a fact of succeeding to secure the area corresponding to the designated total page data size P is notified to the transmission-side device (the digital multifunctional apparatus 1001 at the transmission side) (S2805). Next, page data (image data for one page) and the job mode data including the output process condition data and the original direction detecting data are received from the transmission-side device (S2806), and the received data are stored in the area S (S2807). Then, a print instruction is given to a predetermined unit such as a printer unit or the like to execute a print process according to the job mode data of the received image data (S2808). Accordingly, a remote copy operation to which an original direction detected result is reflected is executed in a printer unit at the reception side. Here, a case of executing a reception process and a print process, to which the original direction detected result is reflected, in real-time in units of page will be explained. However, it may be controlled that the reception process for all pages is collectively executed and then the remote copy operation, to which the original direction detected result is reflected, is started in the printer unit. In this case, the print process is started after storing all the image data for all pages into a memory such as a hard disk or the like in the device at the reception side.

Subsequently, it is judged whether or not the page is a last page by confirming that, for example, a last page command is given to the page data, and when it is judged that the page is not the last page, the flow returns to the process in the step S2806. Here, by repeating procedures from the step S2806 to the step S2809, the page data transmitted from the transmission-side device can be stored in the area S and the print instruction can be simultaneously given.

While, in the step S2809, it is judged that the page is the last page, the flow advances to the step S2810, where the area S secured after ending the print process is released (S2810), and then the process finally ends.

While, in the step S2803, it is judged that the area corresponding to the total page data size P does not exist in the remote print area A2 on the hard disk 2004, the flow advances to the step S2811, and a fact that the area can not be secured is notified to the transmission-side device. In this case, the process is to be executed using an area which is not reserved and secured on the area A2.

When the page data is received from the transmission-side device (S2812), a page size Q is acquired (S2813), and an acquirement demand of the size Q for trying to secure an area for the size Q from a temporary area P in the remote print area A2 on the hard disk 2004 shown in FIG. 20 is performed (S2814).

Next, in the step S2815, it is judged whether or not the area for the size Q is secured, and when it is judged that the area is not secured, the flow advances to the step S2819, and the process is interrupted due to a memory full error.

In the step S2815, when it is judged that the area for the size Q is secured, the flow advances to the step S2816, and the print instruction is given. Next, it is judged whether or not the page is the last page (S2817), and when it is judged that the page is not the last page, the flow returns to the process in the step S2812. Here, by repeating the procedures from the step S2812 to the step S2817, the page data transmitted from the transmission-side device can be stored in the area P and the print instruction can be simultaneously given if the memory full in the area P does not occur.

While, in the step S2817, it is judged that the page is the last page, an area secured from the area P is released after ending the print process (S2818), and the process ends.

Hereinafter, an example of the page print process that the print process based on the original direction detection result by the master (e.g., the digital multifunctional apparatus 1001 on the transmission side) is performed by the slave (e.g., the digital multifunctional apparatus 2903 on the reception side)

will be explained with reference to FIGS. 21 and 22. Here, it should be noted that the page print process is the process of printing the original image data to be printed on a recording paper and also printing the additional information (e.g., the information representing what page the recording paper in question corresponds, the information representing page numbers with hyphens added, etc.) at the position (e.g., upper right, upper center, upper left, lower right, lower center, or lower left) designated on the recording paper by the user. In any case, an example that the page print process is performed in the remote copy mode will be explained hereinafter.

Figure 21:
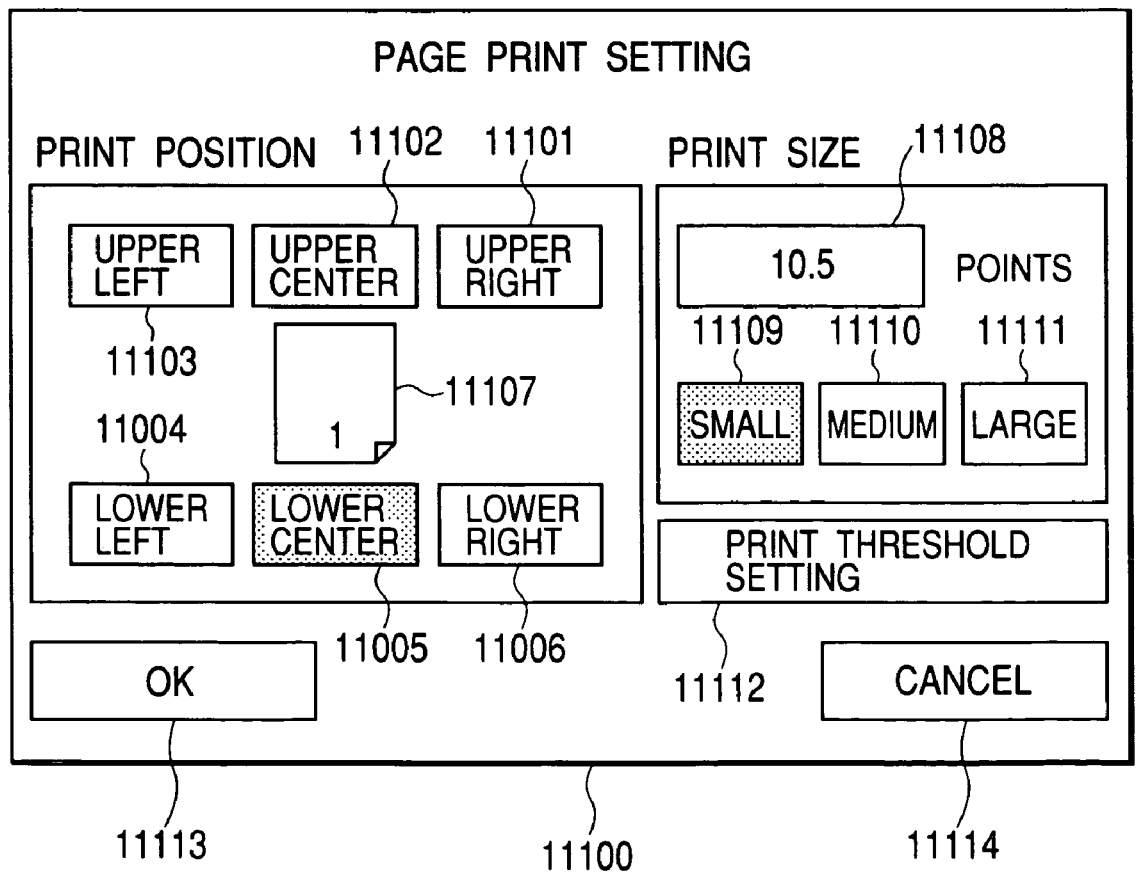
FIG. 21 is a diagram showing an example of a page print setting screen to be displayed on the LCD unit of the operation unit provided in the transmission-side apparatus, in case of performing the remote printing.

FIG. 21 is the diagram showing the example of a page print setting screen to be displayed on the LCD unit 2013 of the operation unit 2012 under the control of the CPU 1001 in the transmission-side apparatus (also simply called the master; the digital multifunctional apparatus 1001 in the embodiment), in case of performing the remote printing.

In FIG. 21, numeral 11100 denotes a page print setting screen for performing the setting concerning print positions, print sizes and print thresholds. The page print setting screen 11100 is displayed when a page print setting key on a not-shown mode setting screen displayed on the LCD unit 2013 of the operation unit 2012 shown in FIG. 4 is depressed (or instructed).

In the print position setting, when any one of print position determination keys 11101 to 11106 (i.e., the upper right key 11101, the upper center key 11102, the upper left key 11103, the lower right key 11104, the lower center key 11105, and the lower left key 11106) is depressed (or instructed), it is possible to select and set which position on the recording paper the original image data should be printed, from among plural candidates (i.e., upper right, upper center, upper left, lower right, lower center, and lower left in the embodiment). Numeral 11107 denotes a page print user support information display area which visually shows the relation between the position corresponding to each of the print position determination keys 11101 to 11106 and the original image. By using the page print user support information display area 11107, the user oneself can confirm which position on the recording paper (on which the original image data is printed) the page number should be printed. Incidentally, when any one of the print position determination keys 11101 to 11106 is depressed, display control is performed to the depressed key to perform screening (or hatching) display, reversing display or the like, whereby an available state (i.e., a selected state) is set to the depressed key. Here, because the default (or initial) setting of the print position is determined as the lower center position, the lower center key 11105 is displayed with screening in an initial state, whereby the setting of the lower center key 11105 is selectable.

The print size of the page number to be printed at the determined print position is determined by depressing any one of print size keys 11109 to 11111 (i.e., the small key 11109, the medium key 11110, and the large key 11111), and the determined print size is displayed in a print size display area 11108. More specifically, the print size is set to 10.5 points when the small key 11109 is depressed, the print size is set to 12 points when the medium key 11110 is depressed, and the print size is set to 14 points when the large key 11111 is depressed. Here, it should be noted that the depressed print size key is displayed with screening. Incidentally, because the default (or initial) setting of the print size is determined as 10.5 points, the small key 11109 is displayed with screening in the initial state.

Numeral 11112 denotes a print threshold setting key. When the print threshold setting key 11112 is depressed (or instructed), a not-shown print threshold setting means operates, and the print threshold setting key 11112 is displayed with screening.

Numeral 11113 denotes an OK key. When the OK key 11113 is depressed (or instructed), the screen is returned to a not-shown precedent screen (i.e., the mode setting screen), and the page print setting is decided. Numeral 11114 denotes a cancel key. When the cancel key 11114 is depressed, the print position and the print size are all set to the default values, and the lower center key 11105 and the small key 11109 are displayed with screening.

Incidentally, when a series of print setting is performed by the user through the operation unit, the page print mode for the job data to be processed can be set through the operation screen displayed on the LCD unit 2013, and other print output process conditions (e.g., the number of prints, double-sided printing, single-side printing, and post-processes such as stapling and the like) for the job data in question can be set through various operation screens (e.g., operation screens shown in FIGS. 23A to 23D). In addition, a local copy mode/remote copy mode operation screen (e.g., the operation screen shown in FIG. 23B) for selecting whether to print the target job data (i.e., the original image data) in the local copy mode or in the remote copy mode is displayed on the LCD unit 2013, whereby the operation mode can be selected by the user. The CPU 2001 performs the display control and its relevant operation control so as to cause the LCD unit 2013 to selectively display such various interface screens as above.

Figure 23B:
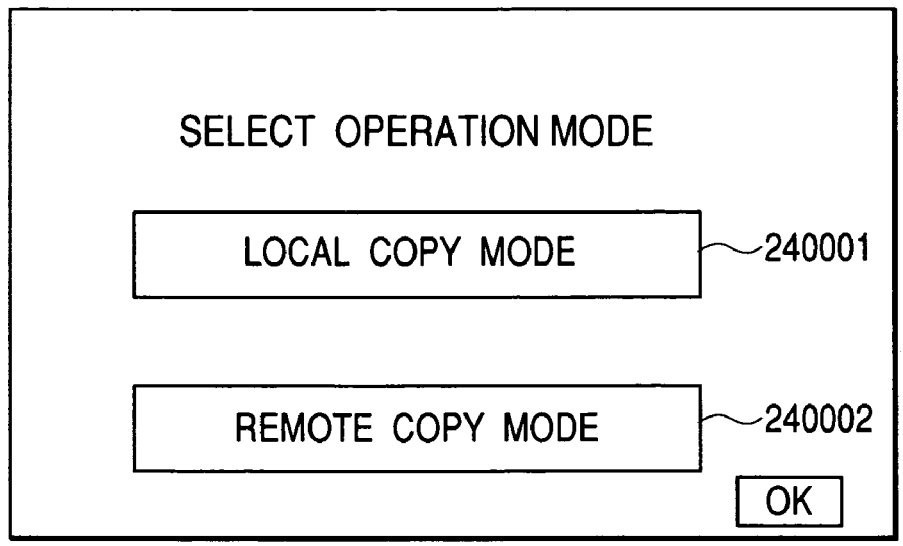

For example, the CPU 2001 causes the LCD unit 2013 to display an operation screen 23000 shown in FIG. 23A as the initial screen, whereby the user can set the paper size, the number of prints, and the double-sided printing through the operation screen 23000. Moreover, when a key 23001 on the operation screen 23000 is depressed by the user, the CPU 2001 causes the LCD unit 2013 to display an operation screen 24000 shown in FIG. 23B. Furthermore, when a key 240001 on the operation screen 24000 is depressed by the user, the CPU 2001 sets the local copy mode. On one hand, when a key 240002 on the operation screen 24000 is depressed by the user, the CPU 2001 sets the remote copy mode to cause the user to specify the remote copy destination through, e.g., the operation screen shown in FIG. 16. Incidentally, when the remote copy mode is selected, the process conditions which have been set through the operation screens shown in FIGS. 23A to 23D are reflected as the process condition in executing the remote copy mode. Then, when a key 23004 is depressed in the state that the operation screen 23000 is being displayed, the CPU 2001 causes the LCD unit 2013 to display a screen 25000 shown in FIG. 23C for setting various application modes. For example, when a key 25001 on the operation screen 25000 for setting the page print mode is depressed by the user, the CPU 2001 causes the LCD unit 2013 to display the operation screen 11100 shown in FIG. 21 for setting the page print mode, whereby the user can perform the detailed setting in the page print mode.

Figure 22:
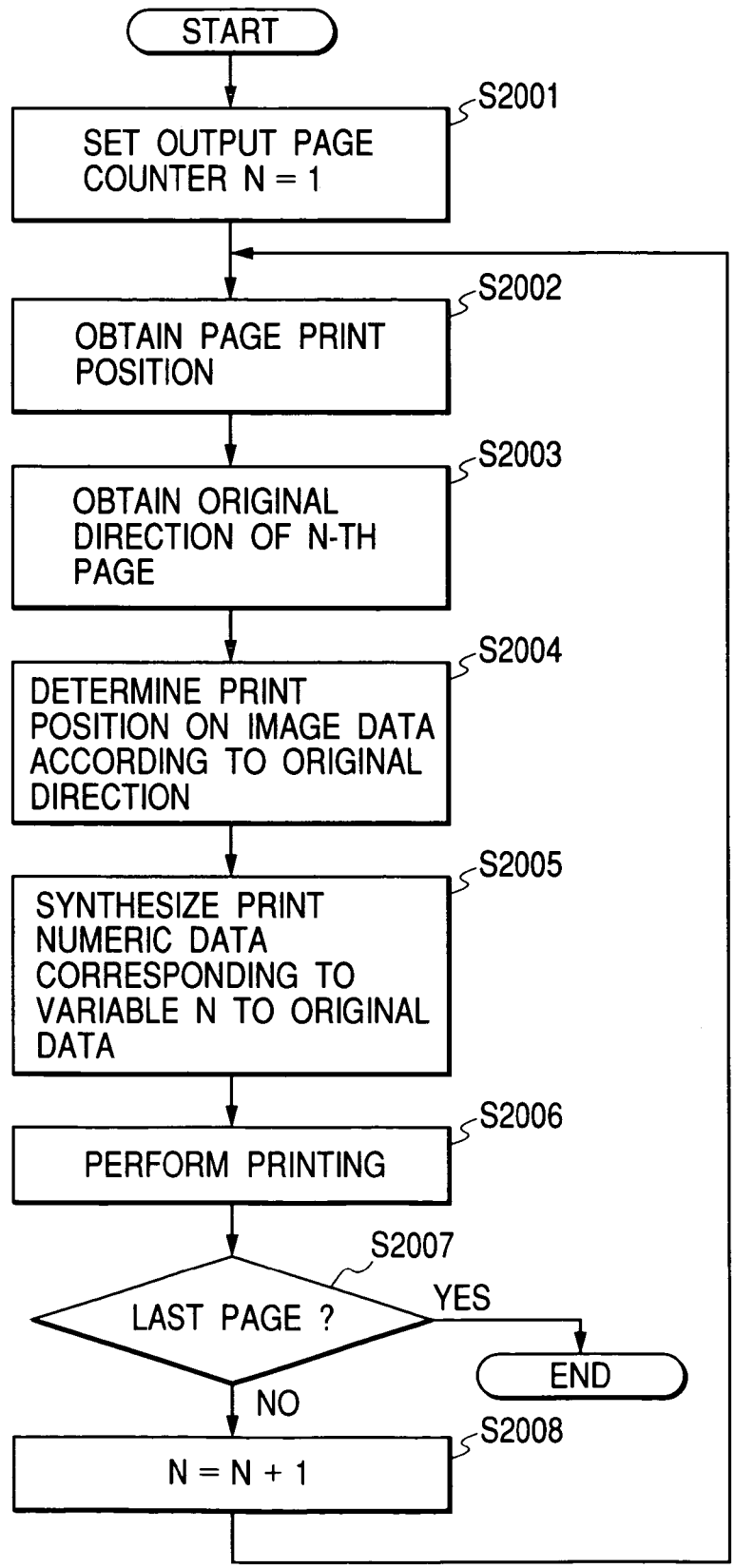
FIG. 22 is a flow chart showing an example of a third control processing procedure in the image forming system to which the image input apparatus and the image output apparatus according to the present invention are applicable.

FIG. 22 is the flow chart showing an example of a third control processing procedure in the image forming system to which the image input apparatus and the image output apparatus according to the present invention are applicable. Here, it should be noted that the third control processing procedure corresponds to the page print process on the reception side (e.g., the reception-side digital multifunctional apparatus 2903 of receiving a remote copy job from the transmission-side digital multifunctional apparatus 1001) in case of performing the remote print mode. Besides, it is assumed that the third control processing procedure in the flow chart of FIG. 22 is entirely controlled and executed by the CPU 2001 on the basis of the program stored in the ROM 2003 or the HDD 2004 shown in FIG. 2, or another storage medium. Moreover, symbols S2001 to S2008 denote respective steps of performing various processes.

Figure 23C:
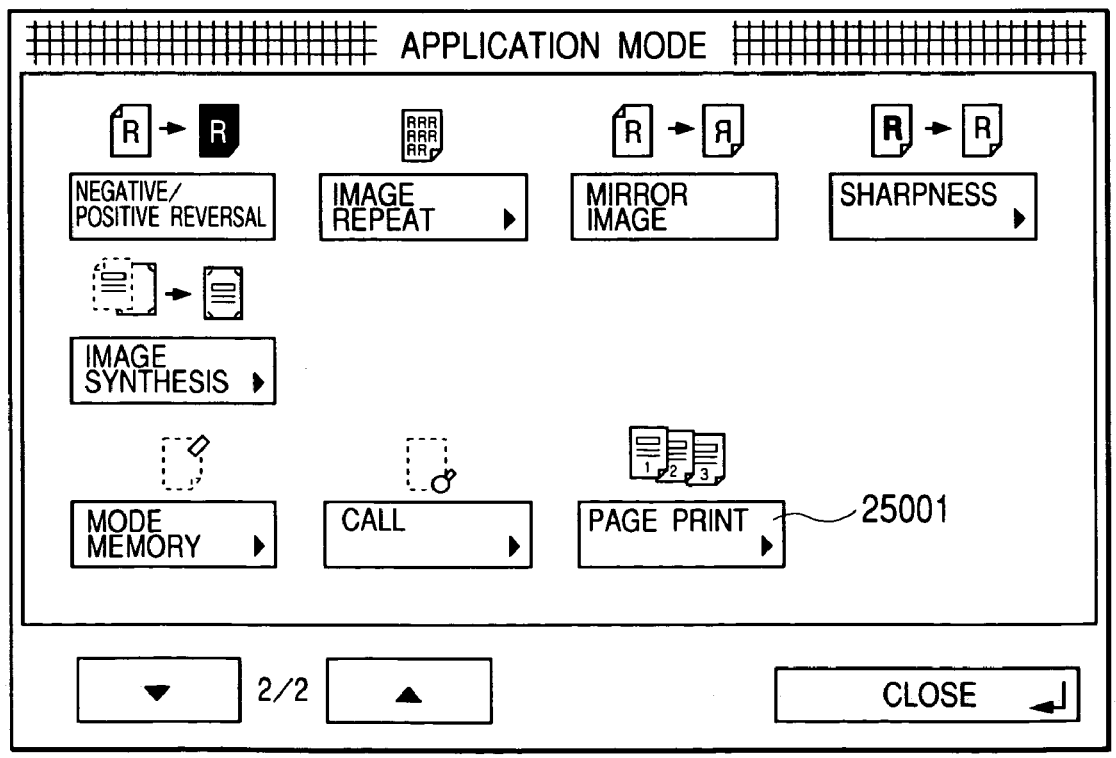

Incidentally, the third control processing procedure premises that the remote copy mode is set by the master (i.e., the transmission-side digital multifunctional apparatus 1001) through the operation screen 24000 shown in FIG. 23B, the page print mode is set by the master through a page print mode key 25001 on the operation screen 25000 shown in FIG. 23C, and the details in the page print mode are set through the operation screen 11100 shown in FIG. 21. Besides, it is assumed that various data (e.g., job mode data including the print process condition data and the original direction detection data, and another job mode data) are transmitted from the digital multifunctional apparatus 1001 to the digital multifunctional apparatus 2903 under the control of the CPU 2001 of the digital multifunctional apparatus 1001.

When the job data (i.e., the job mode data including the print process condition data and the original direction detection data, and the original image data corresponding to another job mode data) to which the page print mode is set is input through the communication unit of the digital multifunctional apparatus 2903 (e.g., the step S2801 in FIG. 19), a variable (output page counter N) for counting the number of output pages is initialized (N=1) in the step S2001 (that is, the page is set to first page). Then, in the sep S2002, the page print position information of N page designated by the user through the operation unit of the master shown in FIG. 21 is obtained (acquired) from the set content in the page print mode included in the job mode data transmitted from the master. Subsequently, in the step S2003, the original direction result information of N page included in the job mode data and detected on the side of the master is obtained.

Next, in the step S2004, the page print position on the image data corresponding to the original direction result is determined. That is, the vertical direction of the image data is determined based on the original direction result, and the image data position corresponding to the page print position designated by the user is determined.

Then, in the step S2005, (when the printing is instructed in the step S2808 of FIG. 19), the print numeric data is synthesized to the image data position determined in the step S2004. Subsequently, in the step S2006, the image data is output and printed.

Next, in the step S2007, it is judged whether or not the last page is output. When it is judged that the last page is not output, the flow advances to the step S2008 to increment the variable (i.e., the output page counter) N, and then the flow returns to the step S2002.

On the contrary, when it is judged in the step S2007 that the last page is output, the page print process ends.

According to the embodiment, in the image forming system which includes the first device (e.g., the digital multifunctional apparatus 1001) as above and the second device (e.g., the digital multifunctional apparatus 2903) capable of performing the data communication with the first device, the following output process can be performed by enabling to execute the above control. Hereinafter, the output process in question will be explained with reference to FIG. 24A.

For example, as shown in FIG. 24A, it is assumed that a job A of an A4 original consisting of three pages (here, the first and third pages are downward (resupinate) and the second page is upward (upright)) is input by the first device (i.e., the digital multifunctional apparatus 1001) set on the local side (also called a remote copy source side), the job A is transferred to the second device (i.e., the digital multifunctional apparatus 2903) set on the remote side, and the transferred job A is printed out in the page print mode (i.e., through the remote copy operation). In this case, the following procedure and control are performed.

That is, first, it is assumed that the job A is set to the scanner of the digital multifunctional apparatus 1001 by the user. In this case, in response to the user setting on the operation screen 23000 of FIG. 23A displayed on the LCD unit 2013 of the digital multifunctional apparatus 1001, the CPU 2001 acquires the paper size information (A4 size in this case) and the output copy number information (one copy in this case) being the output process condition information. Moreover, in response to the user's depression of the key 240002 on the operation screen 24000 of FIG. 23B which is used to cause the user to select either the local copy mode or the remote copy mode, the remote copy mode is selected for the job A. Furthermore, in response to the user's depression of the application mode key 23004 on the operation screen 23000 of FIG. 23A, the displayed content of the LCD unit 2013 is changed to the content of the operation screen 25000 of FIG. 23C which is used to cause the user to set various application modes for the job A. Furthermore, when the key 25001 which is used to select the page print mode being the image forming mode for causing to print together with the original image data of the job A the page number information on the recording paper on which the original image data in question should be printed is depressed on the operation screen 25000 of FIG. 23C, the CPU 2001 sets the page print mode for the job A and also causes the LCD unit 2013 to display the page print setting screen 11100 of FIG. 21 for causing the user to set on the recording paper the print position of the page number information to be printed on the recording paper together with the original image data of the job A. Then, in response to the user's setting on the page print setting screen 11100, the CPU 2001 acquires the page number position information (representing the lower right of the recording paper in this case) as the detailed information in the page print mode.

Subsequently, when the above user's operation ends and the start key 2014 on the operation unit 2012 of the digital multifunctional apparatus 1001 is depressed by the user, the CPU 2001 controls the various units to start the actual processes for the job A. For example, the CPU 2001 causes the scanner to read the original of the job A set on the scanner of the digital multifunctional apparatus 1001, and then causes the HDD 2004 of the digital multifunctional apparatus 1001 to sequentially store the read original image data. Moreover, in parallel with such a reading process for the job A, the CPU 2001 causes the original direction detection unit 2500 of the digital multifunctional apparatus 1001 to detect the original direction based on the original image data of the job A, and thus acquires the original direction detection result of the job A from the original direction detection unit 2500. Incidentally, at that time, the CPU 2001 further acquires the original size information (A4 size in this case) of the job A in response to the original size detection result information output from the scanner. Thus, the CPU 2001 acquires the information representing "portrait (vertical writing) original and downward (180°)" as the original direction detection information of the first page of the original included in the job A of the A4 three-page original, the information representing "portrait (vertical writing) original and upward (0°)" as the original direction detection information of the second page of the original included in the job A, and the information representing "portrait (vertical writing) original and downward (180°)" as the original direction detection information of the third page of the original included in the job A.

After such a series of processes, it is controlled by the CPU 2001 to set the output process condition data (the number of originals "3", the original size "A4", the paper size "A4", the number of output copies "1", the remote copy mode, the page print mode, and the page print position "lower right") of the job A mainly acquired in response to the user's operation and the original direction detection data (the first page "portrait and downward", the second page "portrait and upward", and the third page "portrait and downward") of the job A acquired in response to the original direction detection result from the original direction detection unit 2500, in the memory of the HDD 2004 or the like as the job mode data of the job A. Then, it is further controlled by the CPU 2001 to cause the communication unit to transfer the job mode data of the job A to the digital multifunctional apparatus 2903 being the remote side through the predetermined communication medium such as the LAN 1010 shown in FIG. 14 or the like together with the original image data of the job A stored in the HDD 2004 as associating it with the original image data, and further cause the digital multifunctional apparatus 2903 to perform the print process of the transferred job A as the remote copy operation according to the job mode data including the output process condition data and the original direction detection data. More specifically, it is controlled to print the processed image data of the job A on each of three recording papers in units of page after the image rotation process to the original image of the job A according to the original direction detection data, and further print the page numbers (-1-, -2- and -3-) of the original of the job A at the lower right of the respective recording papers. In FIG. 24A, numeral 24002 denotes an output result according to the control of the embodiment.

Here, the feature of the embodiment will be explained as the output result 24002 according to the control of the embodiment is compared with an output result 24001 obtained when the job is output without the control of the embodiment. The output result 24001 is directed to an example in a case where the remote copy operation is performed to the job A in the page print mode without reflecting the original direction detection result on the job. That is, in the output result 24001, the direction of the output images A and C of the first and third pages is opposite to that of the output image B of the second page by 180°. Thus, it is apparent that the output result 24001 is an improper job output result. Moreover, the relation between the lower-right page numbers (e.g., -1- and -3-) and the print directions of the original images (e.g., A and C) on the recording papers is improper.

In the embodiment, it is controlled to inhibit that a result such as the output result 24001 is output on the remote side, and to be able to output on the remote side the output result in which the original direction detection result of the local side such as the output result 24002 is sufficiently reflected.

More specifically, for example, on the basis of the information being the original detection data of the job A acquired on the local side and representing that the images of the first and third pages of the original are downward, it is controlled to perform the image rotation process to rotate the images of the first and third pages by 180° so as to form these images as the upright (upward) images, and then print the original image data subjected to the image rotation process on the recording paper together with the page number information (-1- and -3-) of these pages. Here, the images rotated by 180° may be formed by using, e.g., the memory such as the hard disk drive or the like of the digital multifunctional apparatus 2903 on the remote side. Besides, on the basis of the information being the original detection data of the job A acquired on the local side and representing that the image of the second page of the original is upward, it is controlled not to perform the image rotation process to the image in question and to print the original image data as it is on the recording paper together with the page number information (-2-) of the second page.

Thus, in the image forming system according to the embodiment, it is controlled to inhibit that the improper result such as the output result 24001 in which the original direction detection result of the local side is not reflected is output on the remote side, and to output on the remote side the proper output result in which the original direction detection result of the local side such as the output result 24002 is sufficiently reflected.

Incidentally, in case of causing the remote-side device to output the output image according to the original direction detection result acquired by the local-side device, it is possible to structure the system in which an image rotation instruction (e.g., an image rotation command to instruct the image rotation of 180° if the original is downward) according to the original direction detection result is transferred from the local-side device to the remote-side device, and the image rotation process according to the transferred image rotation instruction is performed by the remote-side device. Otherwise, it is possible to structure the system in which only the original direction detection result is transferred from the local-side device to the remote-side device, an image rotation angle is determined by the remote-side device according to the transferred original direction detection result, and then the image rotation process is actually performed by the remote-side device. That is, in any structure, it only has to be able to inhibit the output such as the output result 24001 and output the proper result such as the output result 24002 on the remote-side device. As just described, in case of causing the remote-side device to generate the output result such as the output result 24002, it is possible to structure the system in which mainly the control unit (i.e., the CPU 2001) of the local-side device (i.e., the digital multifunctional apparatus 1001 in this case) controls the output operation, structure the system in which mainly the control unit (i.e., the CPU equivalent to the CPU 2001) of the remote-side device (i.e., the digital multifunctional apparatus 2903 in this case) controls the output operation, and structure the system in which the control units of the local-side and remote-side devices cooperate to cause the remote-side device to be able to output the output result such as the output result 24002. That is, in any structure, it only has to be able to output the proper result such as the output result 24002 on the remote-side device.

Besides, it should be noted that the embodiment works on the image forming mode such as the above page number print mode in which the improper output result is generated and output if the image editing process such as the image rotation or the like is not performed to the original image. That is, the control according to the embodiment of the present invention is applicable not only to the image forming mode such as the above page number print mode but also to the image forming mode which can use the image editing process such as the image rotation or the like (particularly, the image forming mode which affects the image rotation process) in other various image forming modes. Hereinafter, an example of such an image forming mode will be explained with reference to FIG. 24B.

As shown in FIG. 24B, it is assumed that a job B of an A4 original consisting of three pages (here, the first to third pages are downward (resupinate)) is input by the first device (i.e., the digital multifunctional apparatus 1001) set on the local side, the job B is transferred to the second device (i.e., the digital multifunctional apparatus 2903) set on the remote side, and the transferred job B is printed out by the second device in the stapling mode (i.e., through the remote copy operation). In this case, the following procedure and control are performed. Here, it should be noted that the stapling unit provided in each of the first and second devices can perform in the stapling mode the stapling process to the designated one (e.g., upper left) of the candidates consisting of the plural stapling positions (e.g., upper left, upper right, lower left, and lower right) on the recording paper.

That is, first, it is assumed that the job B is set to the scanner of the digital multifunctional apparatus 1001 by the user. In this case, in response to the user setting on the operation screen 23000 of FIG. 23A displayed on the LCD unit 2013 of the digital multifunctional apparatus 1001, the CPU 2001 acquires the paper size information (A4 size in this case) and the output copy number information (one copy in this case) being the output process condition information. Moreover, in response to the user's depression of the key 240002 on the operation screen 24000 of FIG. 23B which is used to cause the user to select either the local copy mode or the remote copy mode, the remote copy mode is selected for the job B. Furthermore, in response to the user's depression of a sorter key 23003 on the operation screen 23000 of FIG. 23A, the displayed content of the LCD unit 2013 is changed to the content of an operation screen 26000 of FIG. 23D which is used to cause the user to set a kind of sorting process for the job B. Furthermore, when a key 26001 which is used to cause a stapling unit (not shown) of the digital multifunctional apparatus 2903 to perform the stapling process to the recording papers on which the original image data of the job B have been printed is depressed on the operation screen 26000 of FIG. 23D, the CPU 2001 sets the stapling mode for the job B and also causes the LCD unit 2013 to display a stapling position setting screen 27000 of FIG. 23E for causing the user to set at which position on the recording paper (on which the original image data of the job B is printed) the stapling process should be performed. Here, to set such a stapling position, the stapling position setting screen 27000 includes an upper left key 27001, an upper right key 27002, a lower left key 27003 and a lower right key 27004. Then, in response to the user's setting with use of any one of the keys 27001 to 27004 on the stapling position setting screen 27000, the CPU 2001 acquires the stapling position information (the upper left of the recording paper responsive to the depression of the upper left key 27001 in this case) as the detailed information in the stapling mode.

Subsequently, when the above user's operation ends and the start key 2014 on the operation unit 2012 of the digital multifunctional apparatus 1001 is depressed by the user, the CPU 2001 controls the various units to start the actual processes for the job B. For example, the CPU 2001 causes the scanner to read the original of the job B set on the scanner of the digital multifunctional apparatus 1001, and then causes the HDD 2004 of the digital multifunctional apparatus 1001 to sequentially store the read original image data. Moreover, in parallel with such a reading process for the job B, the CPU 2001 causes the original direction detection unit 2500 of the digital multifunctional apparatus 1001 to detect the original direction based on the original image data of the job B, and thus acquires the original direction detection result of the job B from the original direction detection unit 2500. Incidentally, at that time, the CPU 2001 further acquires the original size information (A4 size in this case) of the job B in response to the original size detection result information output from the scanner. Thus, the CPU 2001 acquires the information representing "portrait (vertical writing) original and downward (180°)" as the original direction detection information of the first page of the original included in the job B of the A4 three-page original, the information representing "portrait (vertical writing) original and downward (180°)" as the original direction detection information of the second page of the original included in the job A, and the information representing "portrait (vertical writing) original and downward (180°)" as the original direction detection information of the third page of the original included in the job A.

After such a series of processes, it is controlled by the CPU 2001 to set the output process condition data (the number of originals "3", the original size "A4", the paper size "A4", the number of output copies "2", the remote copy mode, the stapling mode, and the stapling position "lower left") of the job B mainly acquired in response to the user's operation and the original direction detection data (the first page "portrait and downward", the second page "portrait and downward", and the third page "portrait and downward") of the job B acquired in response to the original direction detection result from the original direction detection unit 2500, in the memory of the HDD 2004 or the like as the job mode data of the job B. Then, it is further controlled by the CPU 2001 to cause the communication unit (e.g., the communication unit such as the network 2010, the modem 2050 or the like) to transfer the job mode data of the job B to the digital multifunctional apparatus 2903 being the remote side through the predetermined communication medium (e.g., the LAN 1010, the LAN 2011, the WAN 2051 or the like) together with the original image data of the job B stored in the HDD 2004 as associating it with the original image data, and further cause the digital multifunctional apparatus 2903 to perform the print process of the transferred job B as the remote copy operation according to the job mode data including the output process condition data and the original direction detection data. More specifically, it is controlled to cause the digital multifunctional apparatus 2903 to perform the image rotation process to the original image of the job B according to the original direction detection data, and print the rotation-processed image data of the job B on each of the three recording papers. At the same time, it is further controlled to cause the stapling unit of the digital multifunctional apparatus 2903 to perform the stapling process to the upper left of the sheaf of the three recording papers on which the rotation-processed images of the job B have been respectively printed, and then generate two copies of such a printed result. In FIG. 24B, numeral 24004 denotes the output result obtained according to the control of the embodiment.

Here, the feature of the embodiment will be explained as the output result 24004 according to the control of the embodiment is compared with an output result 24003 obtained when the job is output without the control of the embodiment. The output result 24003 is directed to an example in a case where the remote copy operation is performed to the job B in the stapling mode (the stapling position "upper left") according to only the output process condition data without reflecting the original direction detection result on the job. That is, in the output result 24003, the output image is produced with the direction thereof downward. Thus, it is apparent that the output result 24003 is an improper job output result. Moreover, the relation between the upper-left stapling position and the print direction of the original image on the recording paper is improper.

In the embodiment, it is controlled to inhibit that a result such as the output result 24003 is output on the remote-side device, and to be able to output on the remote side the output result in which the original direction detection result of the local side such as the output result 24004 is sufficiently reflected.

More specifically, for example, on the basis of the information being the original detection data of the job B acquired on the local side and representing that the images of the first to third pages of the original are downward, it is controlled to perform the image rotation process to rotate the image of the first page, the image of the second page and the image of the third page respectively by 180° so as to form these images as the upright (upward) images, and then print one by one the original image data subjected to the image rotation process on the recording paper. Here, the images rotated by 180° may be formed by using, e.g., the memory such as the hard disk drive or the like of the digital multifunctional apparatus 2903 on the remote side. Besides, it is controlled to cause the stapling unit of the remote-side device to perform the stapling process to the sheaf of the output recording papers of the first copy, and it is also controlled in case of outputting the recording papers of the second copy to sequentially read the rotation-processed original images from the hard disk drive, print the read images respectively on the recording papers, and then perform the stapling process to the sheaf of the print-processed recording papers (see the output result 24004 shown in FIG. 24B).

Thus, according to the image forming system in the embodiment, in the image forming modes including not only the page print mode as shown in FIG. 24A but also the stapling mode, it is controlled to inhibit that the improper result such as the output result 24003 in which the original direction detection result of the local side is not reflected is output on the remote side, and to output on the remote side the proper output result such as the output result 24004 in which the original direction detection result of the local side is sufficiently reflected.

Incidentally, the mode to which the embodiment is applied is not limited to the page print mode and the stapling mode just as described above. That is, the embodiment is applicable also to a case where the remote copy (or print) operation is performed to the job data (i.e., image data) to which an image forming mode for performing the image editing process such as the image rotation process or the like to the image data and then printing the editing-processed image data on a recording paper is set by a user.

In addition, it is explained in the above embodiment that the CPU 2001 performs the control to cause the original direction detection unit 2500 to perform the original direction detection process to all the pages of the original included in the job to be subjected to the remote copy operation. However, the embodiment is not limited to this. That is, in the embodiment, it may be controlled to cause the original direction detection unit 2500 to perform the original direction detection process only to the original image of a predetermined page (e.g., the original image of the headmost page) included in the job to be subjected to the remote copy operation, and then process the original images of pages subsequent to the predetermined page (e.g., the original images of the second and following pages) in accordance with the direction of the original image of the predetermined page (e.g., the original image of the headmost page) detected by the original direction detection unit 2500. More specifically, as shown in FIG. 24B, on the basis of the information representing that the image of the first page of the original is downward, it is controlled to perform the image rotation process to rotate the images of all the pages (including the first page and the subsequent pages) respectively by 180°. Moreover, in the embodiment, it may be controlled in case of performing the remote copy operation to cause the local-side device (e.g., the digital multifunctional apparatus 1001) to previously include the operation mode (i.e., a first detection mode) of causing the original direction detection unit 2500 to perform the original direction detection process only to the original image of the predetermined page (e.g., the headmost page) included in the job to be subjected to the remote copy operation and then actually performing the remote copy operation and the operation mode (i.e., a second detection mode) of causing the original direction detection unit 2500 to perform the original direction detection process to all the pages of the original included in the job to be subjected to the remote copy operation and then actually performing the remote copy operation, cause a user to be able to select a desired detection mode through the user interface unit (e.g., the operation unit 2012, the LCD unit 2013 or the like) of the local-side device, and cause the controller such as the CPU 2001 or the like to be able to appropriately select and execute the detection mode selected by the user. Of course, the embodiment is also applicable to an apparatus or a system which includes only one of the above first and second detection modes.

Moreover, it is mainly explained in the above embodiment that, in case of performing the remote copy operation, the image data to which the image rotation process is not yet performed is transferred together with the original direction detection data acquired by the local-side device from the local-side device to the remote-side device, the image rotation process based on the transferred original direction detection data is performed to the image data by the remote-side device, and the image subjected to the image rotation process is then printed on the recording paper. However, the embodiment is not limited to this. That is, for example, in case of performing the remote copy operation, it may be controlled by the CPU 2001 to cause a predetermined unit (e.g., the image rotation processing unit 2030) of the local-side device (e.g., the digital multifunctional apparatus 1001) to perform the image rotation process according to the original direction detection data acquired by the local-side device to the original image data to be subjected to the remote copy operation so as to cause the local-side device to generate the rotation-processed image data, further cause the communication unit (e.g., the network 2010, the modem 2050 or the like) to transfer the rotation-processed image data to the remote-side device (e.g., the digital multifunctional apparatus 2903), and then cause the remote-side device to print the transferred rotation-processed image data without performing any image rotation process. In this case, it is controlled to cause the local-side device to transfer to the remote-side device the job mode data to which the output process condition is set but the original direction detection data is not set, and then cause the remote-side device to perform the output process of the rotation-processed image according to the set output process condition. Moreover, in the embodiment, it may be controlled in case of performing the remote copy operation to cause the local-side device (e.g., the digital multifunctional apparatus 1001) to previously include the operation mode (i.e., a first processing mode) of causing the local-side device to perform the image rotation process according to the original detection data without transferring the original detection data acquired by the local-side device to the remote-side device, causing the local-side device to transfer the rotation-processed image data to the remote-side device, and causing the remote-side device to print the transferred image data without performing the rotation process to it, and the operation mode (i.e., a second processing mode) of causing the local-side device to transfer the image data to which the image rotation process is not yet performed to the remote-side device together with the original detection data acquired by the local-side device, causing the remote-side device to perform the image rotation process based on the original detection data transferred from the locals-de device, and causing the remote-side device to print the rotation-processed image on the recording paper, cause a user to be able to select a desired processing mode through the user interface unit (e.g., the operation unit 2012, the LCD unit 2013 or the like) of the local-side device, and cause the controller such as the CPU 2001 or the like to be able to appropriately select and execute the processing mode selected by the user. Of course, the embodiment is also applicable to an apparatus or a system which includes only one of the above first and second processing modes.

Furthermore, in the embodiment, it may be controlled in case of performing the remote copy operation to cause the local-side device (e.g., the digital multifunctional apparatus 1001) to previously include the operation mode (i.e., a first transfer mode) of causing the local-side device to transfer the image data to the remote-side device in units of page and the operation mode (i.e., a second transfer mode) of, in the remote copy operation, causing the memory (e.g., the HDD 2004) of the local-side device (e.g., the digital multifunctional apparatus 1001) to once store the image data of all the pages and then causing the local-side device to transfer in a lump the image data of all the pages in units of job to the remote-side device (e.g., the digital multifunctional apparatus 2903), cause a user to be able to select a desired processing mode through the user interface unit (e.g., the operation unit 2012, the LCD unit 2013 or the like) of the local-side device, and cause the controller such as the CPU 2001 or the like to be able to appropriately select and execute the transfer mode in response to the user's operation. Of course, the embodiment is also applicable to an apparatus or a system which includes only one of the above first and second transfer modes.

As just described, the embodiment is applicable to various kinds of structures. More specifically, the embodiment is applicable to any structure if it is controlled by the controller such as the CPU 2001 or the like on the local-side and/or the controller on the remote-side to inhibit that the improper output images such as the output result 24001 shown in FIG. 24A and the output result 24003 shown in FIG. 24B on which the original detection result is not reflected in case of performing the remote copy operation are output on the remote-side device, and it is on one hand controlled by the controller that the proper output images such as the output result 24002 shown in FIG. 24A and the output result 24004 shown in FIG. 24B on which the original detection result is sufficiently reflected in case of performing the remote copy operation can be output on the remote-side device.

Moreover, as just described, it is controlled as the embodiment to cause the local-side device to perform the image output in the output form based on the original detection information acquired by the local-side device, according as the image forming mode (e.g., a reduction layout mode for intensively printing plural images on one recording paper, a punching processing mode for performing a punching process to the recording paper on which the image has been formed, a book binding processing mode, or the like) including the stapling mode, the page print mode and the like in which the more proper image output result can be acquired in the remote copy mode by performing the image editing process such as the rotation process of the original image data input to the local-side device is selected by the user through the operation unit of the local-side device. However, the embodiment is not limited to this. That is, the following structure may be applied in consideration of the productivity by which the time necessary for the image editing process such as the image rotation process or the like in the remote copy mode can be shortened.

For example, in the image processing system, the above control sequence (called a first control sequence) and another control sequence (called a second control sequence) for controlling the remote-side device to output and print the image data of which the direction is the same as that of the original input by the local-side device, irrespective of the original direction detection information acquired by the local-side device, irrespective of which direction the original image data is input in by the local-side device, and without causing the remote-side device to output the image data subjected to the image editing process such as the image rotation process or the like based on the above original detection information, are provided beforehand, and it enables to selectively execute either one of the first control sequence and the second control sequence. More specifically, the original image data subjected to the image reading process with the original image direction downward by the local-side device is controlled to be printed with the same original image direction by the remote-side device.

Moreover, for example, when the image forming mode (called a first-type image forming mode) including the stapling mode, the page print mode, the reduction layout mode, the punching mode and the like in which the more proper image output result can be acquired in the remote copy mode by performing the image editing process such as the rotation process of the original image data input to the local-side device is set by the user through the operation unit of the local-side device, each of the first device and the second device is controlled so as to execute the above first control sequence.

On one hand, it is assumed that the stapling mode and the page print mode are not set, the above first-type image forming mode is not set, and instead the image forming mode in which the output result is not so affected and thus an unavailable output result is not produced even if the image editing process such as the image rotation process or the like is not performed is set by the user through the operation unit of the local-side device. More specifically, the image forming mode in question includes a non-post-process mode such as a non-sort mode for simply performing the print process without performing the post-process such as the sorting process, the stapling process or the like, and is called a second-type image forming mode. In this case, each of the first device and the second device is controlled so as to inhibit the first control sequence from being executed and execute the second control sequence.

Moreover, in the embodiment, the case where the remote output mode that the image data (job) input to the one image data generation source such as the one local-side device or the like is output by the one remote-side device is set is mainly explained. However, the embodiment is also applicable to a multiprint (multicopy) mode that the image data (job) input to the one image data generation source such as the one local-side device or the like is output by the plural printers such as the printer of the local-side device and the printer of the remote-side device. Thus, even in the multiprint mode, the above control of the embodiment can be executed in response to the user's operation concerning the multiprint mode on the operation unit of the local-side device. Therefore, for example, when the multiprint mode is set by the user, it is controlled by the controller such as the CPU 2001 or the like to cause the printer of the local-side device to output and print the original image data input by the scanner of the local-side device, in the output form according to the original detection data acquired by the original direction sensor of the local-side device. Moreover, it is controlled to cause the printer of the remote-side device capable of performing the data communicating with the local-side device to output and print the original image data input by the scanner of the local-side device, in the output form according to the original detection data acquired by the original direction sensor of the local-side device. As just described, it is controlled to perform in parallel the print processes by the plural printers in accordance with the original direction detection information.

Thus, it is possible to provide the remote output environment and the system construction which can cope with various user's needs and achieve both the improvement of operability and the improvement of productivity.

In the conventional remote copy operation and multicopy operation, because there is no means for notifying the reception-side image forming apparatus the original direction information detected by the transmission-side image forming apparatus, it is impossible for the reception-side image forming apparatus to perform the print process according to the image direction detection result detected by the transmission-side image forming apparatus. However, as just described, according to the embodiment, the original direction detection information detected by the transmission-side image forming apparatus can be transmitted to the reception-side image forming apparatus, and the print process according to the image direction detection result detected by the transmission-side image forming apparatus can be performed by the reception-side image forming apparatus, whereby it is possible to improve convenience of the operations in the remote print operation.

Incidentally, in the embodiment, the process and the operation in the case where the page print mode and the stapling mode are set from the master (e.g., the transmission-side digital multifunctional apparatus (i.e., the local-side device at least having the image input unit, the original direction information acquirement unit and the data communication unit)) are explained. Besides, even in a case where a print mode for printing header and/or footer, a print mode for printing the number of copies, and a print mode corresponding to the image process according to the vertical direction of an image are designated, it may be structured to cause the slave (e.g., the reception-side digital multifunctional apparatus (i.e., the remote-side device at least having the data communication unit and the image output unit)) to perform the image forming process according to the print mode (e.g., the print mode for printing header and/or footer, the print mode for printing the number of copies, or the print mode corresponding to the image process according to the vertical direction) based on the original direction information detected by the master and then print the processed image data.

Moreover, in the embodiment, the case where the digital multifunctional apparatus is used as the master (i.e., the transmission-side apparatus (or the image input apparatus)) is explained. However, a network scanner, a device having a communication function capable of transmitting data to the remote device, a monofunctional apparatus having only a transmission function, or the like can be used instead of the digital multifunctional apparatus.

Moreover, in the embodiment, the case where the digital multifunctional apparatus is used as the slave (i.e., the reception-side apparatus (or the image output apparatus)) is explained. However, a network printer, a printer connected to the network through a printer server, a device capable of outputting the data acquired from the local device, a monofunctional apparatus having only an output function, or the like can be used instead of the digital multifunctional apparatus.

Furthermore, in the embodiment, the case where the image data previously stored in the memory box area B of the memory box in the HDD 2004 of the master (i.e., the transmission-side digital multifunctional apparatus (or the image input apparatus)) is processed in the remote print mode is explained (FIG. 15), and the further the case where the original is read and the original direction is detected by the scanner 2070 of the master (i.e., the transmission-side digital multifunctional apparatus (or the image input apparatus)) and then the remote print operation (or the remote copy operation) is performed is explained. On one hand, it is needless to say that the present invention includes not only the structure of covering both the above cases but also the structure of covering either one of the above cases. Moreover, in the latter case, it may be structured in a not-shown step to be executed previous to the step S2701 shown in FIG. 17 to be able to cause the scanner 2070 to read the original image and cause the original direction detection unit 2500 to detect the original direction from the read original image in units of page.

Furthermore, in the embodiment, the case where, in case of performing the remote print operation to the image data in the memory box area B of the HDD 2004, the original direction of the image data in the memory box area B is detected by the original direction detection unit 2500 after the remote print operation is instructed by the user is explained. On one hand, it may be structured that, in regard to the image data of which the original direction has been already detected, the detected original direction result is registered in the memory box area B in correspondence with the image data in question, and then the registered original direction is read and notified to the slave next time so that it becomes unnecessary to detect the original direction any more. Moreover, it may be structured that the job in the memory box area B is maintained as it is even after the remote print operation ended, and thereafter the original direction detection information included in the stored job is read from the memory box area B to be used in a subsequent remote print operation any time when the operation is requested by the user.

Besides, it may be structured that, when the image data is registered in the memory box area B, the original direction of the image data in question is detected by the original direction detection unit 2500, and the detected original direction result is registered in the memory box area B in correspondence with the image data in question.

Moreover, as just described, it is possible to detect the original direction from the image data in units of page (i.e., for each piece of original). Alternately, it is possible to detect the original direction of only the first page of the sheaf of original papers and consider the original directions of the second and following pages to be the same as that of the first page. Moreover, it is possible to cause the user to select either one of such original direction detection methods. Incidentally, in case of detecting the original direction of only the first page and considering the original directions of the second and following pages to be the same as that of the first page, if the sheaf of originals erroneously includes the upside-down original, it is impossible to correctly perform the image process to the upside-down original. However, even if the correct image process cannot be performed to the upside-down original, it is possible to remarkably shorten the time necessary to perform the remote print process by remarkably shortening the original direction detection time.

On one hand, in case of detecting the original direction of the image data in units of page (i.e., for each piece of original), even if the sheaf of originals erroneously includes the upside-down original, it is resultingly possible to correctly perform the image process to the upside-down original, whereby accuracy of the process is improved.

Therefore, as described above, by causing the user to be able to select either one of the original direction detection methods, it is possible to resultingly provide the system by which the user can arbitrarily select whether to attach importance to the accuracy of the process or to attach importance to the shortening of the processing time.

Incidentally, it is mainly explained in the embodiment the example of the control for causing the remote-side device to print the image data transmitted from the local-side device, in the output form according to the original detection data acquired by the local-side device, and such an operation is called the remote copy (or print) operation. However, the embodiment is not limited to this. That is, for example, in the output form according to the original detection data, the remote-side device can cause the display unit to display the image data transmitted from the local-side device (e.g., preview display of the image data in the direction based on the original direction detection result acquired by the local-side device), the communication unit to transmit the image data in question to an external apparatus (e.g., E-mail transmission), or the storage medium such as the hard disk drive or the like to store the image data in question. Thus, the embodiment is applicable to the function of the remote output mode at least including any one of the print output process, the display output process and the data transfer process.

Moreover, the present invention also includes various combinations of the above examples and their modified examples. Furthermore, also the logical addition or the logical multiplication of the above examples is applicable to the embodiment.

Hereinafter, the structure of a data processing program which can be read by the image forming system to which the image input apparatus and the image output apparatus according to the present invention are applicable will be explained with reference to a memory map shown in FIG. 25.

That is, FIG. 25 is the diagram for explaining the memory map of the storage medium. Here, it should be noted that, in the storage medium, the various data processing programs which can be read by the image forming system to which the image input apparatus and the image output apparatus according to the present invention are applicable are stored.

Incidentally, although it is not illustrated specifically, also information (including version information, creator information, etc.) for administrating the program groups stored in the storage medium may occasionally be stored in the storage medium, and information (including icon information for discriminatively displaying a program, etc.) depending on an OS or the like on the program reading side may occasionally be stored in the storage medium.

Moreover, the data depending on the various programs are administrated by the directory of the storage medium shown in FIG. 25. Besides, programs or the like to uncompress installed programs and data are occasionally stored when the installed programs and data have been compressed.

Furthermore, the functions of the embodiment shown in FIGS. 17, 19 and 22 may be executed by a host computer based on externally installed programs. In this case, the present invention is applicable even in a case where an information group including programs is supplied from a storage medium (such as a CD-ROM, a flash memory, or an FD) or an external storage medium through a network to the output apparatus.

Incidentally, it is needless to say that the object of the present invention can be achieved in a case where the storage medium storing the program codes of software to realize the functions of the above embodiment is supplied to a system or an apparatus and then a computer (or CPU or MPU) in the system or the apparatus reads and executes the program codes stored in the storage medium.

In this case, the program codes themselves read from the storage medium realize the new functions of the present invention, whereby the storage medium storing these program codes constitutes the present invention.

As the storage medium for supplying the program codes, for example, a flexible disk, a hard disk, an optical disk, a magnetooptical disk, a CR-ROM, a CD-R, a DVD-ROM, a magnetic tape, a nonvolatile memory card, a ROM, an EEPROM, a silicon disk or the like can be used.

Moreover, it is needless to say that the present invention includes not only a case where the functions of the above embodiment are realized by executing the program codes read by the computer, but also a case where an OS (operating system) or the like functioning on the computer executes a part or all of the actual process according to instructions of the program codes, whereby the functions of the above embodiment are achieved by that process.

Furthermore, it is needless to say that the functions of the above embodiment can be achieved in a case where the program read from the storage medium is once written in a memory provided in a function expansion board inserted in the computer or a function expansion unit connected to the computer, and then a CPU or the like provided in the function expansion board or the function expansion unit executes a part or all of the actual process according to the instructions of the program.

Besides, the present invention is applicable to a system consisting of plural devices or to an apparatus comprising a single device. Moreover, it is needless to say that the present invention is applicable to a case where the object of the present invention can be achieved by supplying the program to the system or the apparatus. In this case, when the program which has been stored in the storage medium and is represented by the software to achieve the object of the present invention is read by the system or the apparatus, the system or the apparatus can obtain the above effects of the present invention.

Furthermore, when the program which is represented by the software to achieve the object of the present invention is downloaded from the database on the network according to a communication program, the system or the apparatus can obtain the above effects of the present invention.

As explained above, according to the embodiment of the present invention, the image input apparatus side designates the image editing process to the original, reads the image data from the original, stores the image data of the read original in the memory, detects the direction of the original in regard to the image data, transmits the original direction detection result and the image editing process designation to the image output apparatus through the predetermined communication medium, reads the image data stored in the memory, and transmits the read image data to the image output apparatus through the communication medium, while the image output apparatus side performs the image process according to the image editing process designation received from the image input apparatus, to the image data received from the image input apparatus, on the basis of the original direction detection result received from the image input apparatus, and performs the print output of the image data subjected to the image process. Thus, the print process according to the original direction information detected by the image forming apparatus on the transmission side can be performed by the image forming apparatus on the reception side, whereby, for example, it is possible to structure the remote image forming environment by which convenience of the operations in the remote print operation can be remarkably improved.

While the present invention has been described with reference to what is presently considered to be the preferred embodiment, it is to be understood that the invention is not limited to the disclosed embodiment. On the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing system which includes a first device at least having an input unit capable of inputting image data and a communication unit capable of performing data communication, and a second device at least having a communication unit capable of performing the data communication and an output unit capable of outputting image data, said system comprising:
- a remote output mode setting unit adapted to set a remote output mode for performing through said communication unit the data communication of the image data input by said first device and thus causing said second device to output the communicated image data;
- a direction detection unit adapted to detect a direction of the image data input in the first device;
- a transmission control unit adapted to perform control to transmit the image data to be output by said second device in the remote output mode from said first device to said second device and transmit the direction of the image data detected by said direction detection unit and an instruction of page print to the image data;
- a reception control unit adapted to cause said second device to receive the image data, the direction of the image data and the instruction of the page print transmitted from said first device;
- an image processing control unit adapted to control said second device so as to perform an image process to the image data received from said first device, according to the direction of the image data received from said first device; and
- a controller adapted to synthesize a page number to the image data to which the image process was performed by said second device, and to cause said second device to perform output of the image data to which the page number has been synthesized.

2. A control method for an image processing system which includes a first device at least having an input unit capable of inputting image data and a communication unit capable of performing data communication, and a second device at least having a communication unit capable of performing the data communication and an output unit capable of outputting image data, said method comprising:
- a remote output mode setting step of setting a remote output mode for performing through the communication unit the data communication of the image data input by the first device and thus causing the second device to output the communicated image data;
- a direction detection control step of detecting a direction of the image data input in the first device;
- a transmission control step of performing control to transmit the image data to be output by the second device in the remote output mode from the first device to the second device and transmit the direction of the image data detected in said direction detection control step and an instruction of page print to the image data;
- a reception control step of causing the second device to receive the image data, the direction of the image data and the instruction of the page print transmitted from the first device;
- an image processing control step of controlling the second device so as to perform an image process to the image data received from the first device, according to the direction of the image data received from the first device; and
- a control step of synthesizing a page number to the image data to which the image process was performed by the second device, and causing the second device to perform output of the image data to which the page number has been synthesized.

3. A control method according to claim 2, wherein said control step enables to:
- in a case where a first image forming mode in which an image editing process such as an image data rotation process is necessary is set in the remote output mode, execute a first sequence of causing the second device to output the image data transmitted from the first device, in the manner of outputting based on the direction of the image data acquired by the first device, and
- in a case where a second image forming mode in which the image editing process such as the image data rotation process is unnecessary is set in the remote output mode, execute a second sequence of inhibiting the first sequence and causing the second device to output the image data transmitted from the first device, in a manner of outputting not based on the direction of the image data acquired by the first device.

4. A control method according to claim 2, wherein said control step enables to:
- in a case where at least any one of image forming modes including a stapling mode, a page print mode, a reduction layout mode and a punching mode is set in the remote output mode, execute a first sequence of causing the second device to output the image data transmitted from the first device, in the manner of outputting based on the direction of the image data acquired by the first device, and
- in a case where a non-sort mode is set in the remote output mode, execute a second sequence of inhibiting the first sequence and causing the second device to output the image data transmitted from the first device, in a manner of outputting not based on the direction of the image data acquired by the first device.

5. A control method according to claim 2, wherein:
- in the remote output mode, said control step enables to output from the second device a series of image data consisting of plural pages transmitted from the first device in an image direction based on the direction of the image data acquired by the first device, and
- in the remote output mode, said control step enables to selectively execute a first mode of processing the series of image data consisting of the plural pages based on the direction of the image data acquired for each page of the series of image data consisting of the plural pages, and a second mode of processing the series of image data consisting of the plural pages based on the direction of the image data of a predetermined page of the series of image data consisting of the plural pages.

6. A control method according to claim 2, wherein, in the remote output mode, said control step enables to selectively execute a first processing mode of causing the first device to generate the processed image data obtained by performing an image process based on the direction of the image data acquired by the first device to the image data input by the first device and further causing the second device to output the processed image data, and a second processing mode of causing the second device to generate the processed image data obtained by performing the image process based on the direction of the image data acquired by the first device to the image data input by the first device and further causing the second device to output the processed image data.

7. A control method according to claim 2, wherein, in the remote output mode, in a case where a series of image data consisting of plural pages transmitted from the first device is output by the second device in a manner of outputting based on the direction of the image data acquired by the first device, said control step enables to selectively execute a first transfer mode of transferring the image data in units of page from the first device to the second device, and a second transfer mode of storing all the pages of the series of image data in the first device and then transferring in a lump the image data of all the pages from the first device to the second device.

8. A control method according to claim 2, wherein each of the first device and the second device includes an image input unit, an original direction detection unit, a storage unit capable of storing the image data of plural pages, and a printer unit.

9. A control method according to claim 2, wherein at least either one of the first device and the second device is a multifunctional apparatus which has plural functions including at least any one of a copy function, a printer function, a facsimile function, a box function and a network scanner function.

10. A control method according to claim 2, wherein at least either one of the first device and the second device is a monofunctional apparatus which at least has one of a copy function, a printer function, a facsimile function, a box function and a network scanner function.

11. A computer-readable storage medium storing a computer-executable program to execute a control method for an image processing system which includes a first device at least having an input unit capable of inputting image data and a communication unit capable of performing data communication, and a second device at least having a communication unit capable of performing the data communication and an output unit capable of outputting image data, said method comprising:

a remote output mode setting step of setting a remote output mode for performing through the communication unit the data communication of the image data input by the first device and thus causing the second device to output the communicated image data;

a direction detection step of detecting a direction of the image data input in the first device; and a control step of synthesizing a page number to the image data to which the image process was performed by said second device, and causing said second device to perform output of the image data to which the page number has been synthesized.

* * * * *